United States Patent
LaBelle et al.

(10) Patent No.: US 12,338,744 B2
(45) Date of Patent: *Jun. 24, 2025

(54) NACELLE INLET STRUCTURES, ENGINE ASSEMBLIES AND VEHICLES INCLUDING THE SAME, AND RELATED METHODS

(71) Applicant: The Boeing Company, Arlington, VA (US)

(72) Inventors: Joseph B. LaBelle, Mount Pleasant, SC (US); Richard D. Stokes, Jr., Ladson, SC (US); Kyle C. Advent, Carrollton, GA (US); John Yestrau, Winnipeg (CA); Adrian Stanescu, Maple Valley, WA (US); Dan Davis, Bothell, WA (US); Larry Schneider, Jr., Charleston, SC (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/795,021

(22) Filed: Aug. 5, 2024

(65) Prior Publication Data

US 2024/0410316 A1 Dec. 12, 2024

Related U.S. Application Data

(63) Continuation of application No. 17/721,665, filed on Apr. 15, 2022, now Pat. No. 12,085,016.

(Continued)

(51) Int. Cl.
*F01D 25/24* (2006.01)
*F02C 7/04* (2006.01)

(52) U.S. Cl.
CPC .............. *F01D 25/243* (2013.01); *F02C 7/04* (2013.01); *F05D 2230/23* (2013.01); *F05D 2240/14* (2013.01); *F05D 2260/96* (2013.01)

(58) Field of Classification Search
CPC .. F02C 7/04; F02C 7/045; F01D 25/24; F01D 25/243; F05D 2230/23; F05D 2230/40;
(Continued)

(56) References Cited

U.S. PATENT DOCUMENTS

| 4,674,714 A | 6/1987 | Cole et al. |
| 5,088,277 A | 2/1992 | Schulze |

(Continued)

FOREIGN PATENT DOCUMENTS

| EP | 0178144 B1 | 1/1988 |
| EP | 1495963 A2 | 1/2005 |

(Continued)

*Primary Examiner* — Devon C Kramer
*Assistant Examiner* — Sean V Meiller
(74) *Attorney, Agent, or Firm* — Kolitch Romano Dascenzo Gates LLC

(57) ABSTRACT

Nacelle inlet structures comprise an inlet inner barrel, an inlet outer barrel at least substantially enclosing the inlet inner barrel, an aft bulkhead extending between and operatively coupled to each of the inlet inner barrel and the inlet outer barrel, and an annular load absorber that is operatively coupled to each of the aft bulkhead and the inlet inner barrel. The aft bulkhead is operatively coupled to the inlet inner barrel via the annular load absorber, and the annular load absorber has a U-shaped cross-section that is open toward the inlet outer barrel.

20 Claims, 9 Drawing Sheets

Related U.S. Application Data

(60) Provisional application No. 63/183,754, filed on May 4, 2021.

(58) Field of Classification Search
CPC ........... F05D 2240/14; F05D 2260/941; F05D 2260/96; B64D 33/02; B64D 33/0206
See application file for complete search history.

(56) References Cited

U.S. PATENT DOCUMENTS

| | | | |
|---|---|---|---|
| 6,920,958 | B2 | 7/2005 | Harrison |
| 7,503,425 | B2 | 3/2009 | Strunk |
| 7,923,668 | B2 | 4/2011 | Layland et al. |
| 9,567,905 | B2 | 2/2017 | Porte et al. |
| 10,077,678 | B2 | 9/2018 | Hannecart |
| 10,113,602 | B2 | 10/2018 | Stanescu |
| 10,494,116 | B2 | 12/2019 | Petty, Sr. et al. |
| 11,125,157 | B2 | 9/2021 | Thomas et al. |
| 11,293,302 | B2 | 4/2022 | Vinches et al. |
| 12,116,931 | B2 * | 10/2024 | Guillois ................ F02C 7/045 |
| 2005/0006529 | A1 | 1/2005 | Moe et al. |
| 2008/0078612 | A1 | 4/2008 | Strunk |
| 2011/0131945 | A1 | 6/2011 | Vauchel et al. |
| 2014/0147270 | A1 | 5/2014 | Porte et al. |
| 2015/0044028 | A1 | 2/2015 | Lord et al. |
| 2015/0129045 | A1 | 5/2015 | Kane et al. |
| 2016/0377090 | A1 | 12/2016 | Brown et al. |
| 2020/0108942 | A1 | 4/2020 | Laly |
| 2021/0363921 | A1 | 11/2021 | Thomas et al. |

FOREIGN PATENT DOCUMENTS

| | | |
|---|---|---|
| EP | 3103723 A1 | 12/2016 |
| EP | 3459855 A1 | 3/2019 |
| EP | 3489947 A1 | 5/2019 |
| FR | 2990928 A1 | 11/2013 |
| GB | 2112339 A | 7/1983 |
| GB | 2130158 A | 5/1984 |
| JP | S6194898 A | 5/1986 |
| RU | 2411161 C2 | 2/2011 |
| WO | WO1999016034 A1 | 4/1999 |
| WO | WO2010012899 A2 | 2/2010 |

* cited by examiner

NACELLE INLET STRUCTURES, ENGINE ASSEMBLIES AND VEHICLES INCLUDING THE SAME, AND RELATED METHODS

RELATED APPLICATIONS

The present application is a continuation of U.S. patent application Ser. No. 17/721,665, filed on Apr. 15, 2022, entitled "NACELLE INLET STRUCTURES, ENGINE ASSEMBLIES AND VEHICLES INCLUDING THE SAME, AND RELATED METHODS," which issued Sep. 10, 2024 as U.S. Pat. No. 12,085,016, and is a non-provisional of and claims priority to similarly-titled U.S. Provisional Patent Application No. 63/183,754, filed on May 4, 2021, the complete disclosures of which are incorporated by reference.

FIELD

The present disclosure relates to nacelle inlet structures, engine assemblies and vehicles including the same, and related methods.

BACKGROUND

In various examples of engine assemblies, such as aircraft turbofan engines, a nacelle inlet structure forms a duct for introducing an air flow into an engine. In some such examples, the nacelle inlet structure is operatively coupled to an engine case that supports and/or encloses components of the engine, such as a fan of the engine. In particular, in some such examples, the nacelle inlet structure and the engine case include respective annular flanges that are operatively coupled to one another via a plurality of mechanical fasteners. In some examples, the attachment flange of the nacelle inlet structure takes the form of a metallic ring that is operatively coupled to another component of the nacelle inlet structure, such as via mechanical and/or blind fasteners. However, such metallic rings may be undesirably massive, and the corresponding fasteners may be expensive and/or time-intensive to install and/or maintain.

SUMMARY

Nacelle inlet structures of engine assemblies comprise an inlet inner barrel, an inlet outer barrel, an aft bulkhead, and an annular load absorber. The inlet inner barrel extends circumferentially around an engine axis of the engine assembly and extends at least partially along a direction parallel to the engine axis. The inlet outer barrel at least substantially encloses the inlet inner barrel, and extends circumferentially around the engine axis and at least partially along the direction parallel to the engine axis. The aft bulkhead extends between and is operatively coupled to each of the inlet inner barrel and the inlet outer barrel. The annular load absorber is operatively coupled to each of the aft bulkhead and the inlet inner barrel. The aft bulkhead is operatively coupled to the inlet inner barrel via the annular load absorber, and the annular load absorber has a U-shaped cross-section that is open toward the inlet outer barrel.

DESCRIPTION

Figure 1:
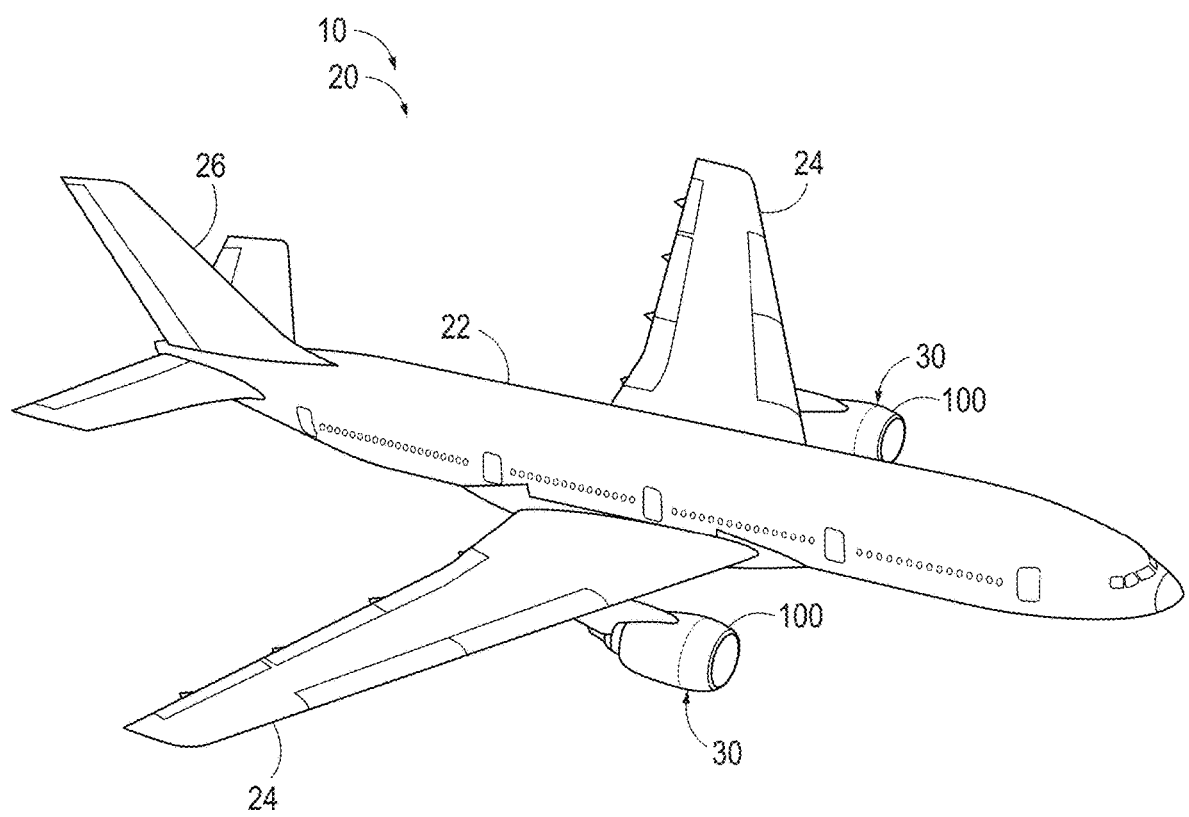
FIG. 1 is a representation of an example of a vehicle in the form of an aircraft that includes engine assemblies with nacelle inlet structures according to the present disclosure.

FIGS. 1-9 provide illustrative, non-exclusive examples of nacelle inlet structures 100, of engine assemblies 30 including nacelle inlet structures 100, of vehicles 10 including engine assemblies 30 and/or nacelle inlet structures 100, of deformable bushings 200, and/or of methods 300 of manufacturing an inlet inner barrel 140 of nacelle inlet structure 100, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure. Additionally, in some Figures, one or more components and/or portions thereof that are obscured from view also may be illustrated in dashed lines.

FIG. 1 illustrates an example of a vehicle 10 that includes engine assemblies 30 with nacelle inlet structures 100 according to the present disclosure. In particular, in the example of FIG. 1, vehicle 10 is an aircraft 20 that includes a fuselage 22, a pair of wings 24 extending from fuselage 22, and a tail 26. In the example of FIG. 1, each wing 24 supports a respective engine assembly 30 that includes nacelle inlet structure 100.

Figure 2:
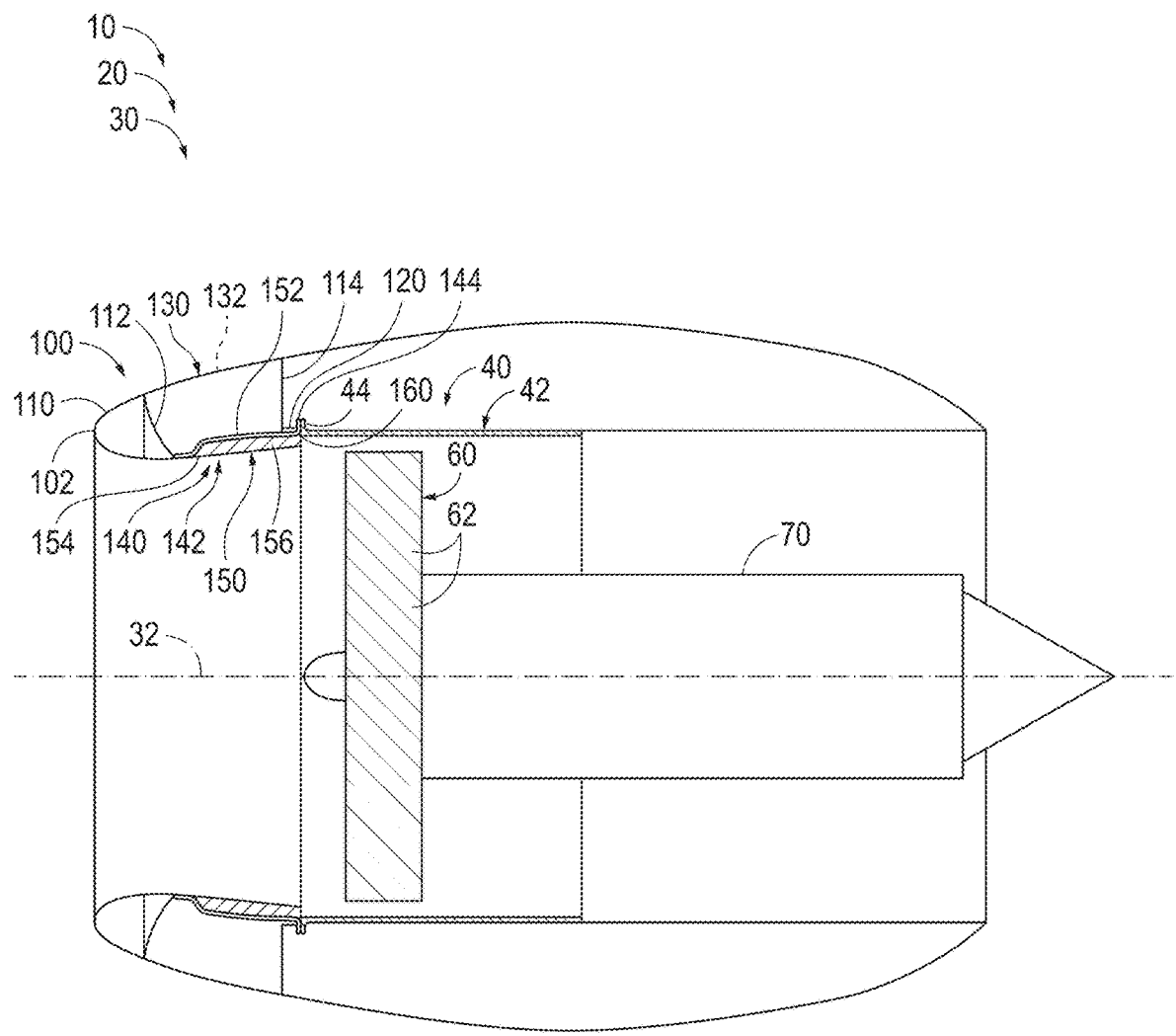
FIG. 2 is a schematic cross-sectional side elevation view representing an example of a nacelle inlet structure according to the present disclosure.
Figure 3:
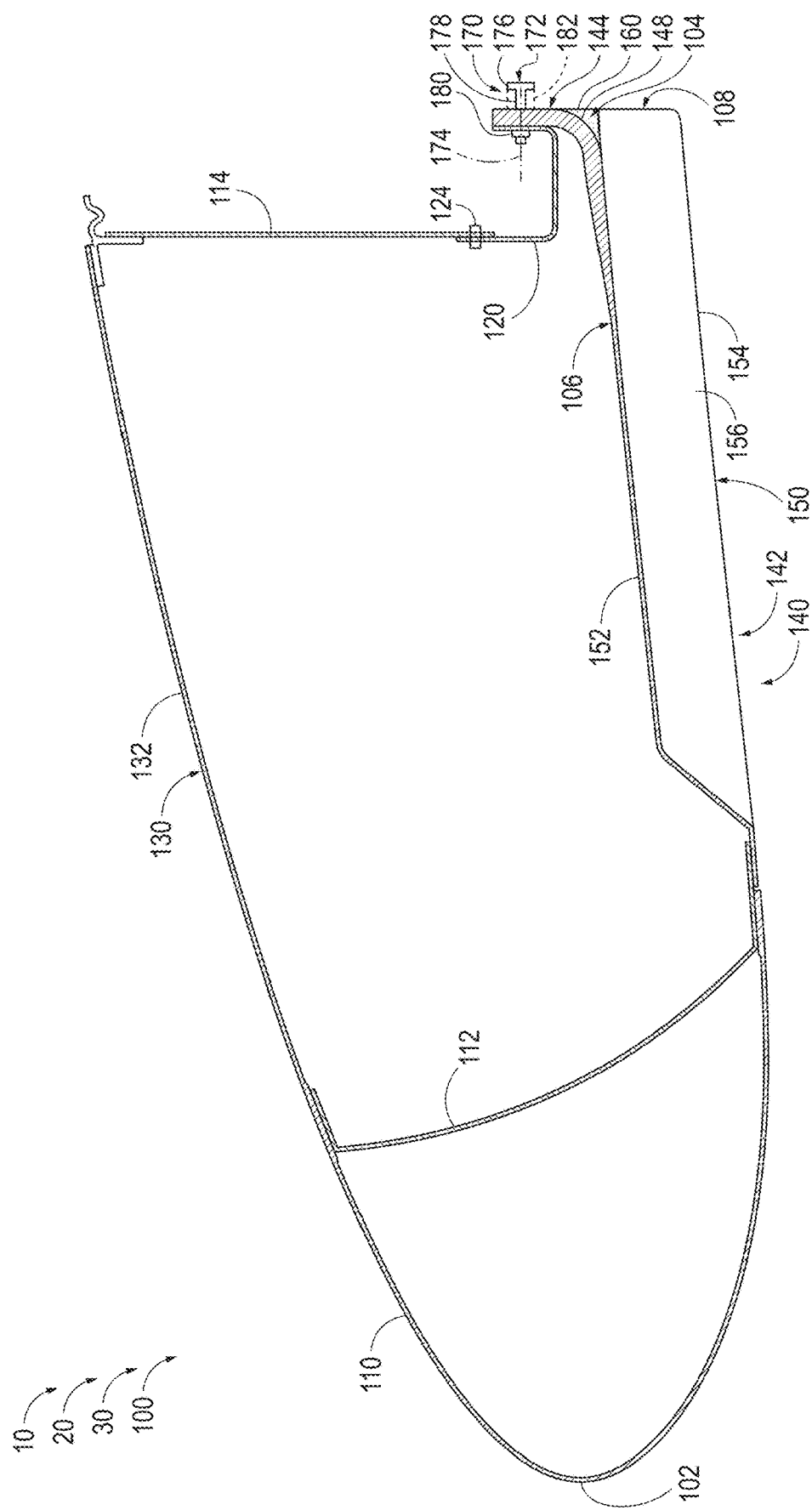
FIG. 3 is a schematic fragmentary cross-sectional side elevation view representing a portion of an example of a nacelle inlet structure according to the present disclosure.
Figure 4:
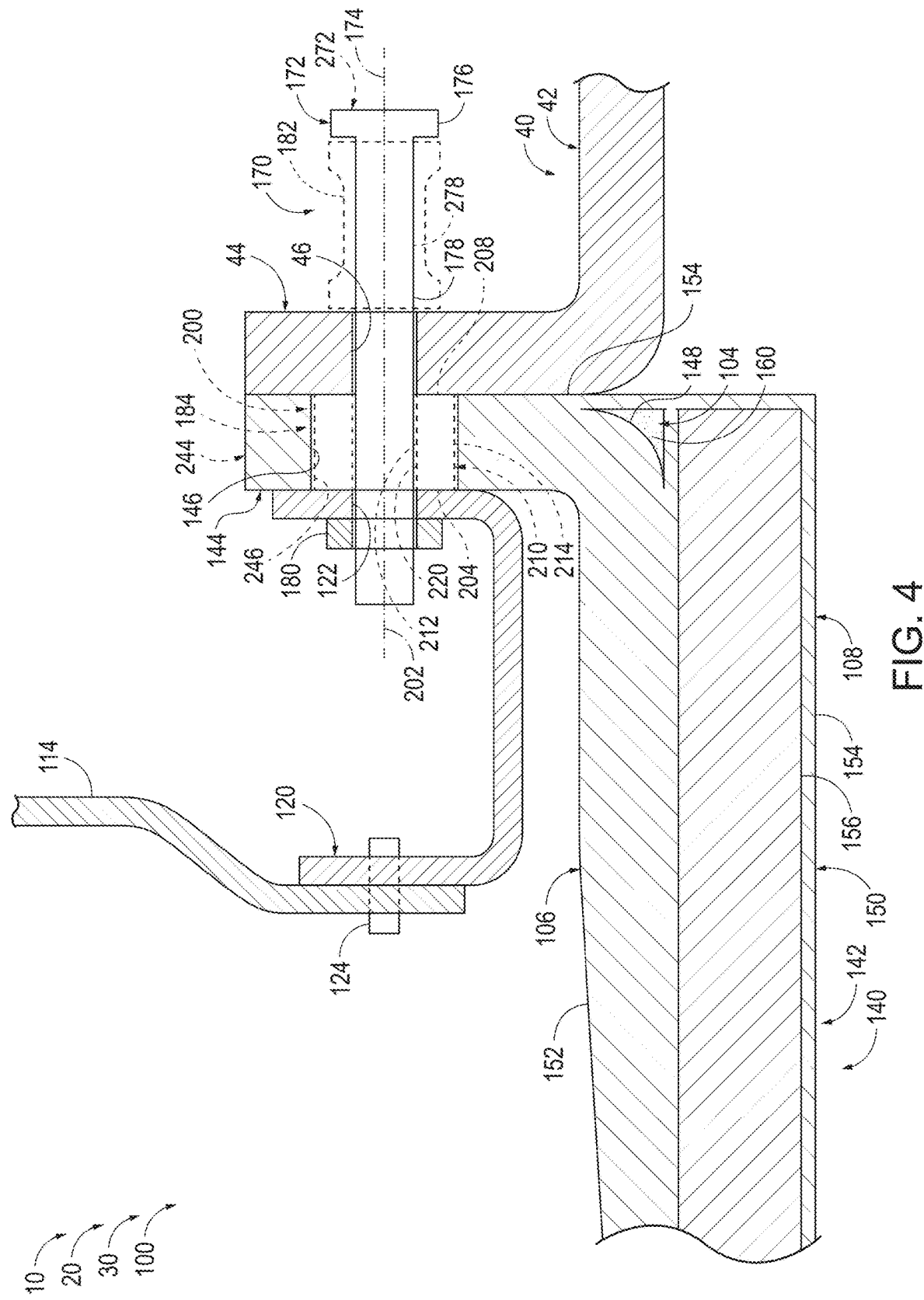
FIG. 4 is a schematic fragmentary cross-sectional side elevation view representing portions of examples of nacelle inlet structures according to the present disclosure.

FIGS. 2-4 schematically illustrate examples and aspects of engine assemblies 30 including nacelle inlet structures 100. In particular, FIG. 2 is a schematic cross-sectional illustration of engine assembly 30 including nacelle inlet structure 100, while FIG. 3 is a schematic cross-sectional illustration of a portion of an example of nacelle inlet structure 100 in isolation. In the example of FIG. 2, engine assembly 30 additionally includes an engine case 40 that is operatively coupled to nacelle inlet structure 100. In some examples, and as schematically illustrated in FIG. 2, engine assembly 30 includes a fan 60, and engine case 40 includes, or is, a fan case 42 that at least substantially encloses fan 60. In particular, FIG. 2 schematically illustrates an example in which engine assembly 30 is a turbofan engine that includes a gas turbine engine 70 for driving fan 60, which in turn operates to generate thrust to propel vehicle 10. However, this is not required of all examples of engine assembly 30, and it is additionally within the scope of the present disclosure that engine assembly 30 may include and/or be any of a variety of engine types, examples of which include a jet engine and a turbojet engine.

In some examples, and as schematically illustrated in FIG. 2, fan 60 includes a plurality of fan blades 62 that are configured to rotate about an engine axis 32 of engine assembly 30 under the power of gas turbine engine 70 to generate a thrust to propel vehicle 10. In the case of an extreme event that stresses engine assembly 30 beyond standard engineering thresholds, such as due to an intake of foreign debris into engine assembly 30, engine assembly 30 may experience a fan blade off (FBO) event in which at least one fan blade 62 departs from fan 60 during operative use of engine assembly 30, thus applying large radial and/or axial forces to components of engine assembly 30. Accordingly, it is desirable to engineer engine assembly 30 such that the remaining components of engine assembly 30 remain intact and/or coupled to one another subsequent to an FBO event so as to avoid further damage to vehicle 10. Accordingly, nacelle inlet structures 100 and deformable bushings 200 according to the present disclosure are configured to withstand the axial and/or radial loads associated with an FBO event such that nacelle inlet structure 100 remains coupled to engine case 40 in such an event.

As used herein, the term "axial," as used to describe a direction and/or a directionality of a force, is intended to refer to a direction that is aligned with, parallel to, and/or at least substantially parallel to engine axis 32. As used herein, the term "radial," as used to describe a direction and/or a directionality of a force, is intended to refer to a direction that is perpendicular to, or at least substantially perpendicular to, engine axis 32, such as a direction that is directed toward or away from engine axis 32.

As schematically illustrated in FIGS. 2-3, nacelle inlet structure 100 includes an inlet outer barrel 130 and an inlet inner barrel 140, each of which extends circumferentially around engine axis 32 of engine assembly 30 (shown in FIG. 2) and extends at least partially along a direction parallel to engine axis 32. In particular, and as schematically illustrated in FIG. 2, inlet outer barrel 130 at least substantially encloses inlet inner barrel 140. In this manner, inlet inner barrel 140 defines a duct for directing air into engine assembly 30, while inlet outer barrel 130 defines at least a portion of an exterior surface of engine assembly 30.

As used herein, the term "at least partially," as used to describe an extent of a component relative to a stated axis or direction, is intended to refer to a configuration in which at least two points along the extent of the component are spaced apart along the stated axis or direction. In some more specific examples, the two points of the component refer to points that are maximally spaced apart along a major dimension of the component. Accordingly, as an example, inlet inner barrel 140 may be described as extending at least partially along a direction parallel to engine axis 32 because various points on inlet inner barrel 140 are spaced apart along a direction parallel to engine axis 32. However, such descriptions do not require that the stated component itself extend parallel to, or at least substantially parallel to, the stated axis or direction, or along a single direction.

As schematically illustrated in FIGS. 2-4, inlet inner barrel 140 includes a tubular portion 142 that extends at least partially along a direction parallel to engine axis 32 (shown in FIG. 2) and an inlet attachment flange 144 extending from tubular portion 142. Specifically, in some examples, and as schematically illustrated in FIGS. 2-4, inlet attachment flange 144 extends radially away from engine axis 32 (shown in FIG. 2) and along a direction at least substantially perpendicular to engine axis 32. In this manner, in such examples, inlet attachment flange 144 extends at least substantially perpendicular to at least a portion of tubular portion 142. As schematically illustrated in FIGS. 2 and 4, inlet attachment flange 144 is configured to be operatively coupled to engine case 40 of engine assembly 30 to operatively couple nacelle inlet structure 100 to engine case 40, as described in more detail herein. In various examples, inlet attachment flange 144 extends fully circumferentially around engine axis 32.

In contrast to prior art nacelle inlet structures, nacelle inlet structures 100 according to the present disclosure are configured such that inlet attachment flange 144 is integrally formed with at least a portion of tubular portion 142 of inlet inner barrel 140. In particular, some prior art nacelle inlet structures include a discrete attachment ring that defines an attachment flange for coupling the prior art nacelle inlet structure to engine case 40. In some such examples, the attachment ring of the prior art nacelle inlet structure extends circumferentially around the inlet inner barrel and is operatively coupled to the inlet inner barrel, such as via mechanical fasteners. Such mechanical fasteners may be expensive and/or may necessitate time-intensive installation and/or maintenance procedures. Additionally, in some examples, the metallic construction of the attachment ring and/or of the associated mechanical fasteners adds an undesirable weight to the overall prior art nacelle inlet structure. By contrast, forming inlet attachment flange 144 of nacelle inlet structures 100 of the present disclosure to be integrally formed with at least a portion of tubular portion 142 eliminates the need for such mechanical fasteners, and also offers weight benefits over the metallic attachment rings of the prior art. Accordingly, in various examples according to the present disclosure, inlet attachment flange 144 is operatively coupled to tubular portion 142 without the use of mechanical fasteners.

As used herein, the terms "integrally formed," "monolithic," "unitary," and the like, as used to describe a structural relationship between two or more components, are intended to refer to examples in which the components refer to respective portions, regions, segments, etc. of an otherwise continuous and/or undifferentiated structure. In this sense, the terms "integrally formed," "monolithic," "unitary," and the like may be used to distinguish alternative examples in which the respective components are formed separately and subsequently brought together, such as via fasteners, adhesion, and/or other mechanical coupling. Additionally or alternatively, the terms "integrally formed," "monolithic," "unitary," and the like may be used to describe a composite structure that is formed of a plurality of plies and/or elements of a composite material, but that is formed (e.g., molded and/or cured) to structurally unite the plurality of plies and/or elements of the composite material to yield a single continuous component.

Inlet outer barrel 130 and inlet inner barrel 140 may be operatively coupled to one another, and/or maintained in a spaced-apart configuration relative to one another, in any of a variety of manners. In some examples, and as schematically illustrated in FIGS. 2-3, nacelle inlet structure 100 includes a lipskin 110 extending between inlet outer barrel 130 and inlet inner barrel 140 at least at a forward end 102 of nacelle inlet structure 100. Accordingly, in such examples, lipskin 110 may be described as forming a leading surface of nacelle inlet structure 100. In some examples, lipskin 110 at least partially defines, or defines at least a portion of, inlet outer barrel 130. Stated differently, in such examples, and as schematically illustrated in FIGS. 2-3, lipskin 110 extends from forward end 102 toward inlet outer barrel 130 in such a manner that lipskin 110 joins, abuts, and/or transitions into inlet outer barrel 130. Additionally or alternatively, in some examples, and as schematically illustrated in FIGS. 2-3, inlet outer barrel 130 includes and/or is an outside mold line (OML) panel 132 that is operatively coupled to lipskin 110 and/or that extends adjacent to lipskin 110.

Similarly, in some examples, lipskin 110 at least partially defines, or defines at least a portion of, inlet inner barrel 140. Stated differently, in such examples, and as schematically illustrated in FIGS. 2-3, lipskin 110 extends from forward end 102 toward inlet inner barrel 140 in such a manner that lipskin 110 joins, abuts, and/or transitions into inlet inner barrel 140. Additionally or alternatively, in some examples, and as schematically illustrated in FIGS. 2-3, lipskin 110 is operatively coupled to, and/or extends adjacent to, tubular portion 142 of inlet inner barrel 140.

In some examples, and as schematically illustrated in FIGS. 2-4, nacelle inlet structure 100 additionally includes a forward bulkhead 112 (shown in FIGS. 2-3) and/or an aft bulkhead 114 extending between and operatively coupled to each of inlet inner barrel 140 and inlet outer barrel 130. In particular, in an example in which nacelle inlet structure 100 includes each of forward bulkhead 112 and aft bulkhead 114, forward bulkhead 112 is positioned proximate to forward end 102 of nacelle inlet structure 100 relative to aft bulkhead 114. While FIGS. 2-4 schematically illustrate forward bulkhead 112 (shown in FIGS. 2-3) and aft bulkhead 114 in cross-section, it is to be understood that forward bulkhead 112 and aft bulkhead 114 each typically are annular structures extending fully circumferentially around engine axis 32 to support inlet inner barrel 140 and inlet outer barrel 130 relative to one another.

In some examples, and as schematically illustrated in FIGS. 2-4, nacelle inlet structure 100 additionally includes an annular load absorber 120 that is operatively coupled to each of aft bulkhead 114 and inlet inner barrel 140. Accordingly, in such examples, aft bulkhead 114 may be described as being operatively coupled to inlet inner barrel 140 via annular load absorber 120. While FIGS. 2-4 schematically illustrate annular load absorber 120 in cross-section, it is to be understood that annular load absorber 120 typically is an annular structure extending fully circumferentially around engine axis 32 to support a full circumference of aft bulkhead 114.

Annular load absorber 120 may be operatively coupled to each of aft bulkhead 114 and inlet inner barrel 140 in any of a variety of manners. In particular, in some examples, and as schematically illustrated in FIGS. 3-4, nacelle inlet structure 100 additionally includes a plurality of absorber fasteners 124 (one of which is visible in each of FIGS. 3-4) that operatively couple annular load absorber 120 to aft bulkhead 114. In such examples, each absorber fastener 124 may include and/or be any of a variety of fasteners, examples of which include a mechanical fastener, a bolt, a rivet, a blind fastener, etc. Additionally or alternatively, in some examples, and as schematically illustrated in FIGS. 2-4, annular load absorber 120 is operatively and/or directly coupled to inlet attachment flange 144 of inlet inner barrel 140.

As discussed, nacelle inlet structure 100 generally is configured to be operatively coupled to engine case 40 via inlet attachment flange 144. In particular, in some examples, and as schematically illustrated in FIGS. 2 and 4, inlet attachment flange 144 is configured to be operatively coupled to fan case 42, such as via a fan case attachment flange 44 of fan case 42, to operatively couple nacelle inlet structure 100 to engine case 40. More specifically, in some such examples, and as schematically illustrated in FIGS. 2 and 4, inlet attachment flange 144 is configured to abut and/or directly engage fan case 42 when nacelle inlet structure 100 is operatively coupled to engine case 40.

In some examples, and as schematically illustrated in FIGS. 3-4, engine assembly 30 and/or nacelle inlet structure 100 includes a plurality of flange bolt assemblies 170 (one of which is visible in each of FIGS. 3-4) for operatively coupling inlet attachment flange 144 to engine case 40. In particular, in some such examples, and as best seen in FIG. 4, each flange bolt assembly 170 includes a respective flange bolt 172 with a respective flange bolt head 176 and a respective flange bolt shank 178 extending away from the respective flange bolt head 176 along a respective flange bolt axis 174.

Each flange bolt assembly 170 may be configured to engage nacelle inlet structure 100 and engine case 40 in any of a variety of manners. In some examples, and as schematically illustrated in FIG. 4, inlet attachment flange 144 at least partially defines each of a plurality of inlet flange bolt receivers 146 (one of which is visible in FIG. 4) circumferentially distributed around engine axis 32, and each inlet flange bolt receiver 146 is configured to receive the respective flange bolt shank 178 of a respective flange bolt assembly 170. More specifically, in some such examples, and as schematically illustrated in FIG. 4, fan case attachment flange 44 defines a plurality of fan case flange bolt receivers 46 (one of which is visible in FIG. 4) such that each inlet flange bolt receiver 146 of inlet attachment flange 144 is aligned with a corresponding fan case flange bolt receiver 46 of fan case attachment flange 44. In such examples, the respective flange bolt shank 178 of each flange bolt assembly 170 extends through each of a respective inlet flange bolt receiver 146 and the corresponding fan case flange bolt receiver 46 to operatively couple nacelle inlet structure 100 to engine case 40.

Each of the plurality of flange bolt assemblies 170 may include any of a variety of structures and/or components in addition to flange bolt 172, such as may be configured to slidingly and/or threadingly engage flange bolt 172. In particular, in some examples, and as schematically illustrated in FIGS. 3-4, each flange bolt assembly 170 additionally includes a respective nut 180 for threadingly engaging the respective flange bolt 172, such as to retain flange bolt 172 relative to inlet flange bolt receiver 146 and fan case flange bolt receiver 46.

Additionally or alternatively, in some examples, and as schematically illustrated in FIGS. 3-4, each flange bolt assembly 170 additionally includes a respective deformable spacer 182 that is configured to be positioned on the respective flange bolt shank 178 external to inlet attachment flange 144. In particular, in some such examples, deformable spacer 182 is configured to be positioned between and engage flange bolt head 176 and either of fan case attachment flange 44 and inlet attachment flange 144.

When present, deformable spacer 182 is configured to undergo a plastic deformation upon receiving an applied compressive load (e.g., along a direction parallel to flange bolt axis 174) that is greater than a threshold compressive load. In particular, in some examples, each deformable spacer 182 is configured to deform plastically responsive to a shock or impact load that corresponds to a force that urges fan case attachment flange 44 and inlet attachment flange 144 away from one another. More specifically, in the event that such a force is greater than the threshold compressive load, deformable spacer 182 absorbs energy from the load via plastic deformation of deformable spacer 182, thus mitigating the risk of such a load causing damage to flange bolt 172, fan case attachment flange 44, and/or inlet attachment flange 144. In some examples, the threshold compressive load at which deformable spacer 182 plastically deforms corresponds to, and/or is less than, a load that is associated with an FBO event. Examples and/or aspects of deformable spacers 182 that may be utilized in conjunction with nacelle inlet structure 100 are disclosed in U.S. Pat. No. 10,113,602, the complete disclosure of which is hereby incorporated by reference.

Additionally or alternatively, in some examples, and as schematically illustrated in FIG. 4, each flange bolt assembly 170 additionally includes a respective bushing 184 that is configured to be positioned within the respective inlet flange bolt receiver 146 to provide a bearing between the respective flange bolt shank 178 and the respective inlet flange bolt receiver 146. Such a configuration may be especially beneficial in examples in which inlet attachment flange 144 is formed of a composite material, such as a carbon fiber-reinforced material. In particular, in such examples, bushing 184 may operate to restrict and/or prevent blooming of the carbon fibers at and/or into inlet flange bolt receiver 146.

Figure 6:
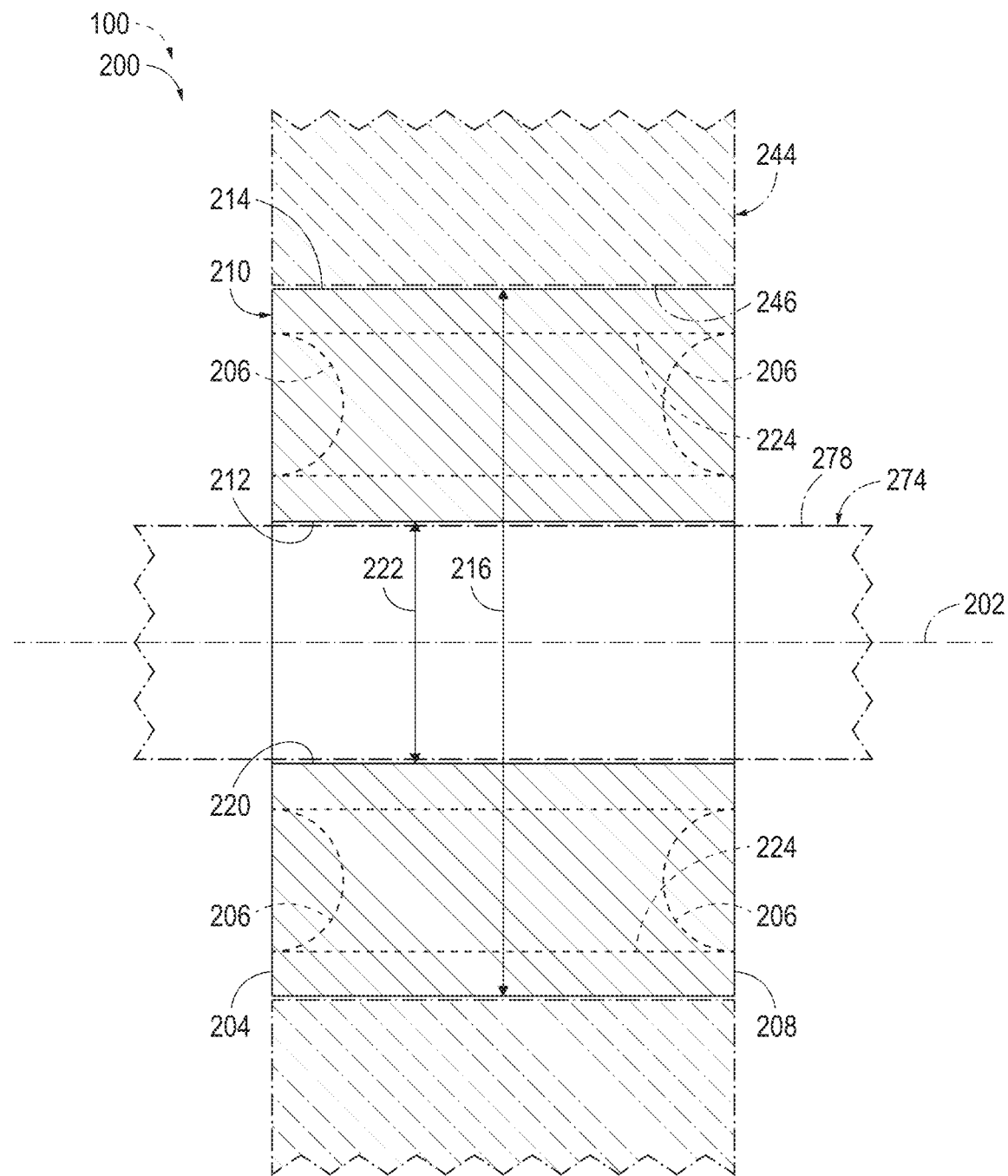
FIG. 6 is a schematic cross-sectional side elevation view representing examples of deformable bushings according to the present disclosure.
Figure 7:
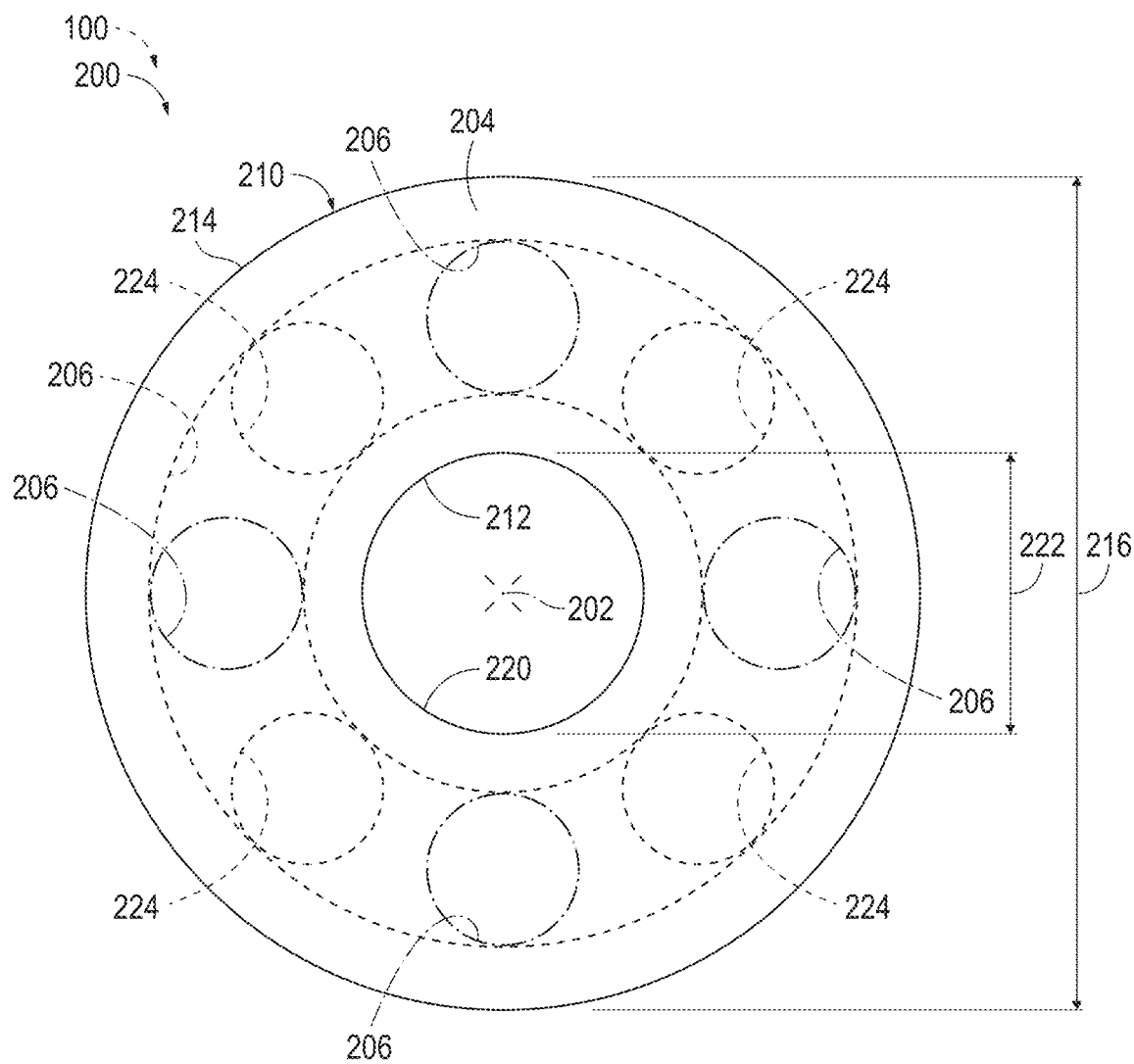
FIG. 7 is a schematic front elevation view representing examples of deformable bushings according to the present disclosure.
Figure 8:
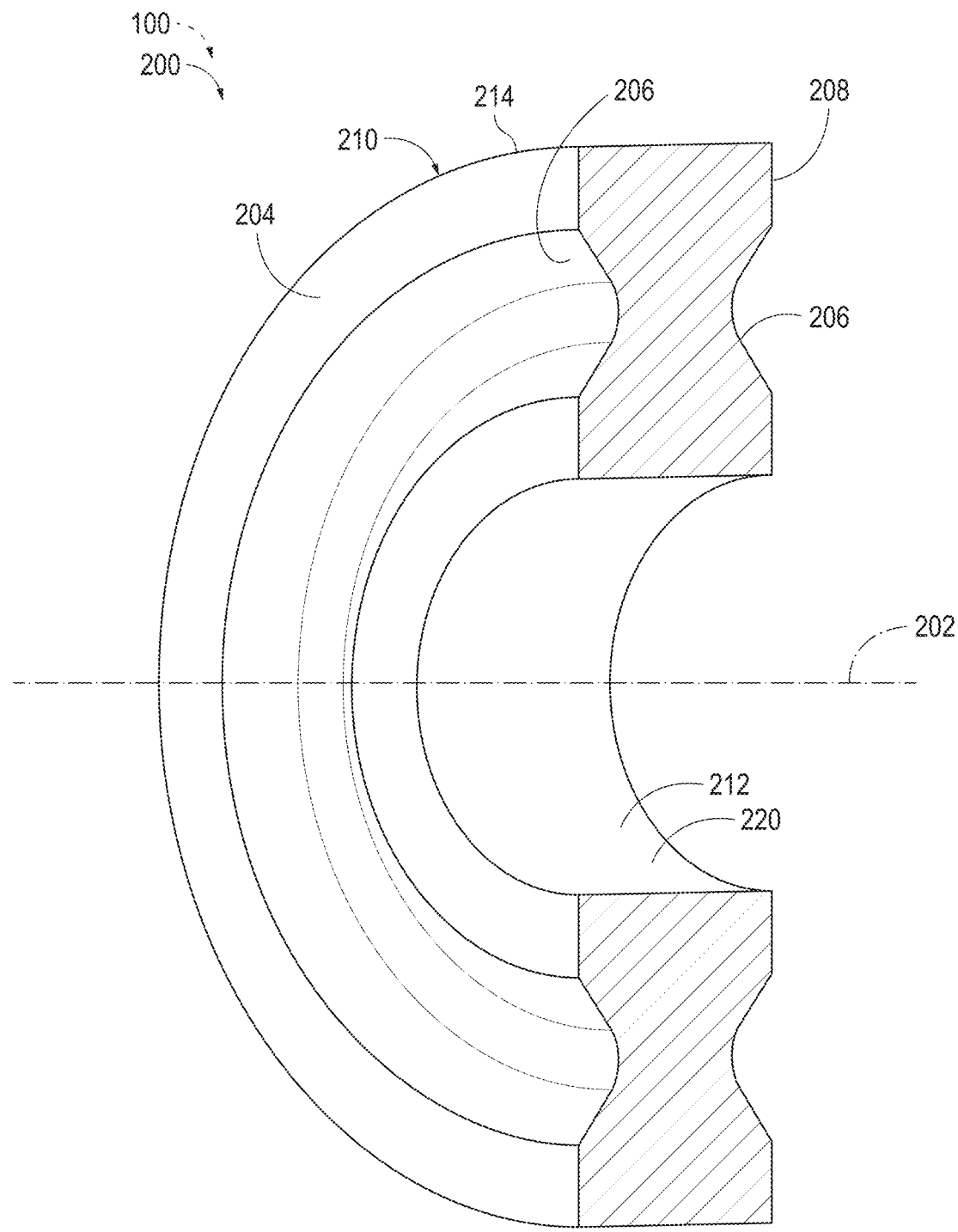
FIG. 8 is a cross-sectional front side isometric view of a first example of a deformable bushing according to the present disclosure.
Figure 9:
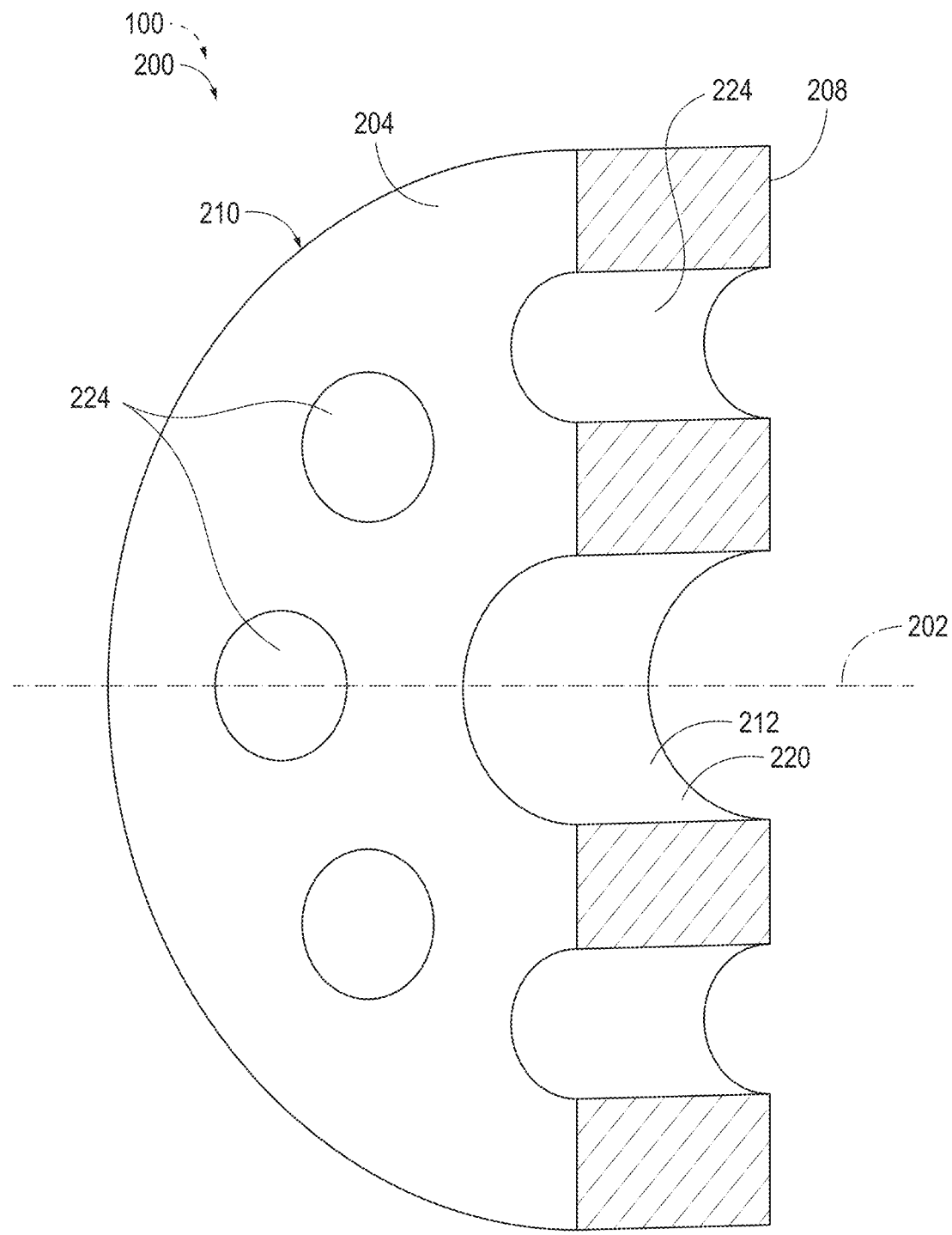
FIG. 9 is a cross-sectional front side isometric view of a second example of a deformable bushing according to the present disclosure.

In some examples, and as schematically illustrated in FIGS. 4 and 6-7 and less schematically in FIGS. 8-9, bushing 184 is a deformable bushing 200 that is configured to undergo a plastic deformation upon receiving an applied load that is greater than a threshold bushing deformation load. As schematically illustrated in FIGS. 4 and 6, deformable bushings 200 according to the present disclosure are configured to provide a bearing between a flange bolt shank 278 of a flange bolt 272 and a flange bolt receiver 246 of an attachment flange 244. In particular, FIG. 4 schematically illustrates an example in which flange bolt 272 is flange bolt 172, flange bolt shank 278 is flange bolt shank 178, attachment flange 244 is inlet attachment flange 144, and flange bolt receiver 246 is inlet flange bolt receiver 146. However, this is not required of all examples of deformable bushing 200, and it is additionally within the scope of the present disclosure that deformable bushing 200 may be utilized in conjunction with flange bolts 272 and/or attachment flanges 244 in any suitable context and/or application. Examples and/or features of deformable bushing 200 are described in more detail below with reference to FIGS. 6-9.

In some examples, and as discussed, annular load absorber 120 is operatively coupled to inlet inner barrel 140. In some such examples, the plurality of flange bolt assemblies 170 also operate to operatively couple annular load absorber 120 to inlet inner barrel 140, such that annular load absorber 120 is operatively coupled to inlet attachment flange 144 via the plurality of flange bolt assemblies 170. In particular, in some such examples, and as schematically illustrated in FIG. 4, annular load absorber 120 defines a plurality of load absorber bolt receivers 122 (one of which is visible in FIG. 4), and each inlet flange bolt receiver 146 is aligned with a corresponding load absorber bolt receiver 122. Accordingly, in such examples, and as schematically illustrated in FIG. 4, each flange bolt shank 178 extends through each of a respective inlet flange bolt receiver 146 and the corresponding load absorber bolt receiver 122 when annular load absorber 120 is operatively coupled to fan case attachment flange 44. However, this is not required of all examples of nacelle inlet structure 100, and it additionally is within the scope of the present disclosure that annular load absorber 120 may be operatively and/or directly coupled to another component of inlet inner barrel 140, such as tubular portion 142.

Inlet inner barrel 140 may exhibit and/or include any of a variety of configurations, structures, and/or components. For example, and as discussed, inlet inner barrel 140 may be described as including tubular portion 142 and inlet attachment flange 144. In some examples, and as schematically illustrated in FIGS. 2-4, inlet inner barrel 140 and/or tubular portion 142 additionally includes a back skin 152 that faces toward inlet outer barrel 130 and/or a face sheet 154 that faces toward engine axis 32 (shown in FIG. 2) and that is at least partially spaced apart from back skin 152. In some examples, and as perhaps best illustrated in FIG. 4, a portion of face sheet 154 extends radially away from engine axis 32 (shown in FIG. 2) such that face sheet 154 extends adjacent to at least a portion of inlet attachment flange 144. In particular, in some such examples, and as illustrated in FIG. 4, back skin 152 engages, intersects, and/or is integrally formed with face sheet 154.

When present, and as schematically illustrated in FIGS. 2-4, back skin 152 is integrally formed with inlet attachment flange 144. In particular, in such examples, tubular portion 142 of inlet inner barrel 140 includes at least a portion of back skin 152 such that inlet attachment flange 144 is integrally formed with at least a portion of tubular portion 142; namely, at least the portion of tubular portion 142 that forms back skin 152. More specifically, in some examples, and as discussed in more detail below in conjunction with FIG. 5, inlet attachment flange 144 and back skin 152 are formed in a composite manufacturing process as a unitary composite structure. In particular, in some examples, and as schematically illustrated in FIGS. 3-4, inlet inner barrel 140 includes a composite laminate 106 that includes each of inlet attachment flange 144 and back skin 152. Stated differently, in such examples, inlet attachment flange 144 and back skin 152 may be described as representing respective components and/or regions of a composite laminate 106. In some such examples, and as schematically illustrated in FIGS. 3-4, inlet inner barrel 140 and/or tubular portion 142 includes a barrel base structure 108 such that composite laminate 106 is operatively coupled to barrel base structure 108.

In some examples, nacelle inlet structure 100 additionally or alternatively includes one or more structures for mitigating and/or attenuating an acoustic noise generated during operative use of engine assembly 30. In particular, in some examples, and as schematically illustrated in FIGS. 2-4, inlet inner barrel 140 includes an acoustic structure 150 for mitigating acoustic noise generated by engine assembly 30. In some such examples, and as schematically illustrated in FIGS. 2-4, tubular portion 142 of inlet inner barrel 140 includes acoustic structure 150. Additionally or alternatively, in some examples, and as schematically illustrated in FIGS. 3-4, barrel base structure 108 includes at least a portion of acoustic structure 150.

In some examples, and as schematically illustrated in FIGS. 2-4, acoustic structure 150 includes an acoustic structure core 156 that operates to mitigate and/or attenuate the acoustic noise generated by engine assembly 30. In some such examples, at least a portion of acoustic structure core 156 extends between back skin 152 and face sheet 154. Additionally or alternatively, in some examples, acoustic structure 150 includes at least a portion of back skin 152 and/or at least a portion of face sheet 154. When present, acoustic structure 150 and/or acoustic structure core 156 may include and/or be any of a variety of structures that are known to the art of acoustic engineering, examples of which include an acoustic panel, an acoustic liner, a honeycomb panel, a resonator, and/or a Helmholtz resonator. As a more specific example, acoustic structure core 156 may be a honeycomb core, and face sheet 154 may be a perforated face sheet 154 that enables acoustic waves to traverse face sheet 154 into and out of acoustic structure core 156.

In some examples, and as schematically illustrated in FIGS. 3-4, inlet inner barrel 140 may be described as including a flange transition region 148 extending between and interconnecting tubular portion 142 and inlet attachment flange 144. In particular, in such examples, flange transition region 148 is integrally formed with each of inlet attachment flange 144 and at least a portion of inlet inner barrel 140 and/or of tubular portion 142, such as back skin 152 and/or face sheet 154. Stated differently, in such examples, flange transition region 148 may be described as referring to a portion (e.g., an annular portion) of inlet inner barrel 140 within which tubular portion 142 and/or back skin 152 transitions into inlet attachment flange 144. In some examples, and as schematically illustrated in FIGS. 3-4, flange transition region 148 is smoothly curved between tubular portion 142 and inlet attachment flange 144.

In some examples, flange transition region 148 transitions, curves, and/or extends radially away from another component of inlet inner barrel 140, such as tubular portion 142 and/or acoustic structure 150. In some such examples, and as schematically illustrated in FIGS. 3-4, inlet inner barrel 140 includes and/or defines an inlet radius channel 104 that is defined between flange transition region 148 and one or more other portions of inlet inner barrel 140, such as barrel base structure 108, tubular portion 142, acoustic structure 150, back skin 152, and/or face sheet 154. In particular, in some examples, and as schematically illustrated in FIGS. 3-4, inlet radius channel 104 corresponds to a region that is defined between composite laminate 106 and barrel base structure 108 in a region adjacent to flange transition region 148. Additionally or alternatively, in some examples, and as schematically illustrated in FIGS. 3-4, flange transition region 148 corresponds to a portion of back skin 152 that curves radially away from acoustic structure 150, thus defining inlet radius channel 104 between flange transition region 148 and acoustic structure 150. In some such examples, the portion of acoustic structure 150 adjacent to inlet radius channel 104 may be described as being a portion of barrel base structure 108, while the portion of back skin 152 that curves away from acoustic structure 150 may be described as being a portion of composite laminate 106. Additionally or alternatively, in some examples, and as perhaps best illustrated in FIG. 4, inlet radius channel 104 is defined between flange transition region 148, a portion of back skin 152, and a portion of face sheet 154. In this manner, in such examples, inlet radius channel 104 may be described as being at least substantially bounded and/or enclosed by flange transition region 148, back skin 152, and face sheet 154. In such examples, inlet radius channel 104 may be described as being defined between flange transition region 148 and a portion of tubular portion 142 that includes back skin 152 and/or face sheet 154.

While the present disclosure generally relates to examples in which composite laminate 106 includes a portion of back skin 152 that curves away from acoustic structure 150 and inlet attachment flange 144, it additionally is within the scope of the present disclosure that composite laminate 106 further encompasses any other composite materials that are molded and/or structurally united with back skin 152 and inlet attachment flange 144. In particular, in some examples in which inlet radius channel 104 is defined between flange transition region 158, a portion of back skin 152, and a portion of face sheet 154, composite laminate 106 may be described as including at least a portion of back skin 152 and/or of face sheet 154, such as a portion that at least partially defines inlet radius channel 104.

In some examples in which inlet inner barrel 140 includes inlet radius channel 104, and as schematically illustrated in FIGS. 3-4, inlet inner barrel 140 additionally includes an inlet radius filler 160 that is received within inlet radius channel 104. In particular, in some such examples, and as schematically illustrated in FIGS. 3-4, inlet radius filler 160 at least substantially fills inlet radius channel 104. In particular, in such examples, inlet radius filler 160 may be configured to enhance a rigidity of inlet attachment flange 144 relative to tubular portion 142, such as by restricting inlet attachment flange 144 from bending, flexing, etc. relative to tubular portion 142. When present, inlet radius filler 160 may be formed of any of a variety of radius filler materials, examples of which include chopped carbon fibers, a rigid material, an epoxy, a cured epoxy, and a potting compound. In some examples, inlet radius filler 160 also may be referred to as a noodle 160. In an example in which inlet radius channel 104 is at least substantially bounded and/or enclosed by flange transition region 148, back skin 152, and face sheet 154, such as in the example of FIG. 4, such a configuration thus may ensure that inlet radius filler 160 also is at least substantially bounded and/or enclosed by flange transition region 148, back skin 152, and face sheet 154, thereby facilitating forming a robust bond between such elements during manufacture of nacelle inlet structure 100.

Figure 5:
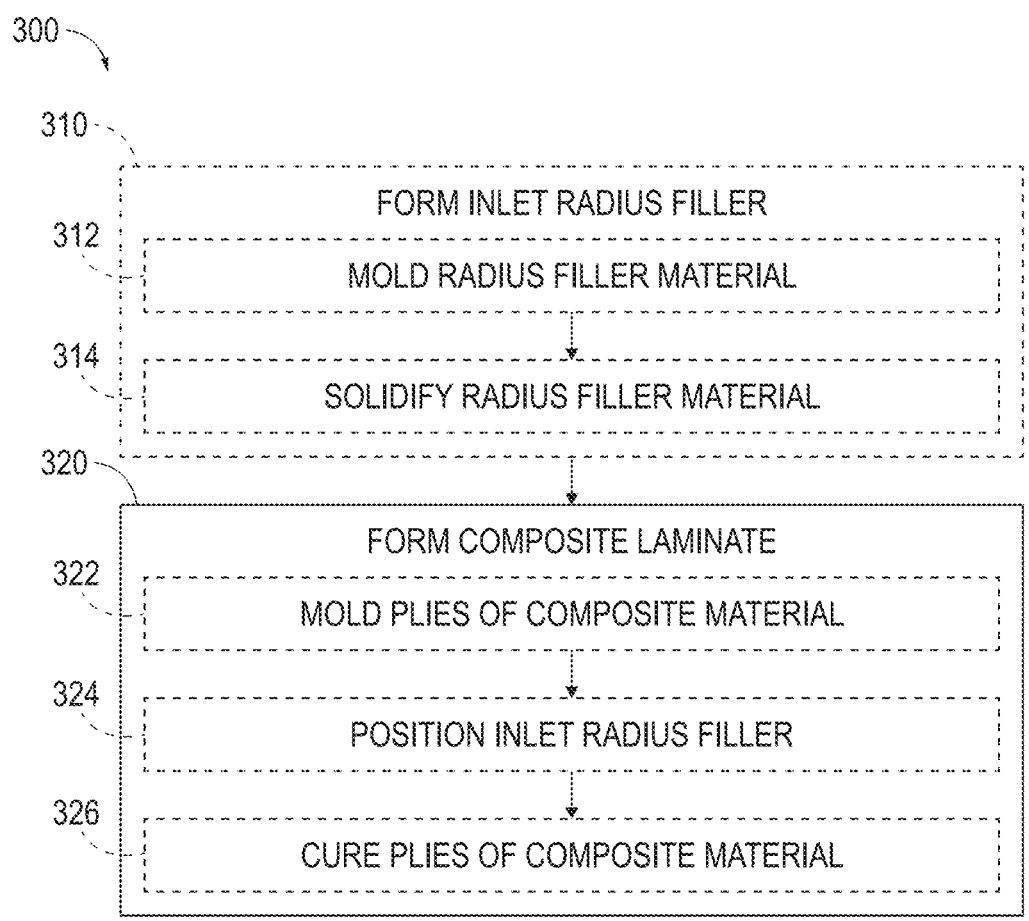
FIG. 5 is a flowchart representing examples of methods, according to the present disclosure, of manufacturing an inlet inner barrel of a nacelle inlet structure.

FIG. 5 represents a flowchart depicting methods 300, according to the present disclosure, of manufacturing an inlet inner barrel of a nacelle inlet structure, such as inlet inner barrel 140 of nacelle inlet structure 100 as descried herein. As shown in FIG. 5, methods 300 include forming, at 320, a composite laminate that includes a back skin (such as back skin 152 of inlet inner barrel 140) and an inlet attachment flange (such as inlet attachment flange 144 of inlet inner barrel 140). In particular, the forming the composite laminate at 320 includes forming with a composite manufacturing process, as described herein. Examples of composite laminates that may be formed via methods 300 are described herein with reference to composite laminate 106. In particular, as used herein with reference to methods 300, the term "composite laminate" is intended to refer to a structure that is formed of a plurality of plies of a composite material and that includes regions corresponding to a back skin and an inlet attachment flange as described herein. Accordingly, as used herein with reference to methods 300, the term "composite laminate" may be used to refer to such a structure as embodied at any appropriate step of methods 300, and thus may refer to a structure that is not yet fully formed and/or cured.

In some examples, and as shown in FIG. 5, the forming the composite laminate at 320 includes molding, at 322, a plurality of plies of a composite material to define each of the back skin and the inlet attachment flange and, subsequent to the molding the plurality of plies of the composite material at 322, curing, at 326, the plurality of plies of the composite material to solidify the composite laminate. The composite material may include and/or be any of a variety of materials known to the art of composite manufacturing, examples of which include a fiber-reinforced material and/or a carbon fiber-reinforced material.

The molding the plurality of plies of the composite material at 322 may include configuring the back skin and the inlet attachment flange in any of a variety of manners. In some examples, the molding the plurality of plies of the composite material at 322 includes configuring the composite laminate to include a number of plies of the composite material that varies across an extent of the composite laminate. In particular, in some examples, the molding the plurality of plies of the composite material at 322 includes forming the inlet attachment flange with a greater number of plies of the composite material than the number of plies of the composite material that form a tubular portion of the back skin. As more specific examples, in various examples, the inlet attachment flange is formed to include about 20-50 plies of composite material, while one or more of a portion of the back skin, and/or of a face sheet (such as face sheet 154 disclosed herein) spaced apart from the inlet attachment flange are formed to include about 1-6 plies of composite material. In this manner, the molding the plurality of plies of the composite material at 322 may include configuring the composite laminate to feature enhanced strength and/or rigidity in regions corresponding to various components of the inlet inner barrel. Examples of the tubular portion of the back skin are described herein with reference to the portion of tubular portion 142 of inlet inner barrel 140 that is formed by back skin 152.

In various examples, the molding the plurality of plies of the composite material at 322 includes utilizing any of a variety of composite manufacturing techniques, such as by assembling the plies of the composite material in and/or on a preformed mold and/or by compressing the plies of the composite of material with a vacuum bag system. Similarly, in various examples, the curing the plurality of plies of the composite material at 326 includes utilizing any of a variety of composite manufacturing techniques, such as curing the plurality of plies of the composite material with an autoclave.

In some examples, the molding the plurality of plies of the composite material at 322 includes forming a flange transition region and an inlet radius channel. Examples of flange transitions regions and/or inlet radius channels that may pertain to methods 300 are described herein with reference to flange transition region 148 and/or inlet radius channel 104, respectively. In particular, in some examples, the molding the plurality of plies of the composite material at 322 includes molding such that the plurality of plies of the composite material are curved (e.g., follow a curved profile) within the flange transition region such that positioning the plurality of plies of the composite material relative to another structure (e.g., the barrel base structure and/or another component of the tubular portion of the inlet inner barrel) yields the inlet radius channel at least partially defined by the flange transition region. In particular, in some examples, the molding the plurality of plies of composite material at 322 includes positioning the composite laminate relative to a barrel base structure (such as barrel base structure 108 described herein) such that the inlet radius channel is defined between the composite laminate and the barrel base structure, such as at a location adjacent to the flange transition region.

In some such examples, and as shown in FIG. 5, methods 300 additionally include, prior to the curing the plurality of plies of the composite material at 326, positioning, at 324, an inlet radius filler relative to the composite laminate. Examples of inlet radius fillers that may be utilized in conjunction with methods 300 are described herein with reference to inlet radius filler 160. In some examples, the positioning the inlet radius filler at 324 includes positioning the inlet radius filler within an inlet radius channel associated with the composite laminate, such as inlet radius channel 104 described herein. In particular, in some examples, the positioning the inlet radius filler at 324 is performed at least partially subsequent to the molding the plurality of plies of the composite material at 322 such that at least a portion of the inlet radius channel has been at least initially formed prior to the positioning the inlet radius filler at 324. In some other examples, the positioning the inlet radius filler at 324 and the molding the plurality of plies of the composite material at 322 are performed at least partially concurrently. More specifically, in some such examples, the positioning the inlet radius filler at 324 includes positioning such that the inlet radius filler forms a portion of a mold that serves to shape the plurality of plies of the composite material. In such examples, the positioning the inlet radius filler at 324 may be described as operating to at least partially form and/or define the inlet radius channel and/or the flange transition region. Additionally or alternatively, in some examples, the inlet radius filler operates to at least partially support the plurality of plies of the composite material during the curing the plurality of plies of the composite material at 326.

Additionally or alternatively, in some examples, the molding the plurality of plies of the composite material at 322 is performed at least partially subsequent to the positioning the inlet radius filler at 324. In particular, in some examples, the molding the plurality of plies of the composite material at 322 includes, subsequent to the positioning the inlet radius filler at 324, positioning at least a portion of the back skin and/or of the face sheet adjacent to the inlet radius filler. In this manner, in such examples, at least substantially enclosing and/or encapsulating the inlet radius filler within the plurality of plies of the composite material prior to the curing the plurality of plies of the composite material at 326 may enhance a geometrical stability and/or rigidity of the cured composite laminate.

In some examples, and as shown in FIG. 5, methods 300 additionally include, prior to the positioning the inlet radius filler at 324, forming, at 310, the inlet radius filler. More specifically in some such examples, and as shown in FIG. 5, the forming the inlet radius filler at 310 includes molding, at 312, a radius filler material into a shape corresponding to a shape of the inlet radius channel and/or solidifying, at 314, the radius filler material to form the inlet radius filler as a solid structure. As discussed above in the context of inlet radius filler 160, the radius filler material may include and/or be any of a variety of materials, examples of which include chopped carbon fibers, a rigid material, an epoxy, a cured epoxy, and a potting compound. In various examples, forming the inlet radius filler as a solid structure prior to the positioning the inlet radius filler at 324 serves to facilitate the forming the composite laminate at 320. In particular, in some such examples, and as discussed above, the solidified inlet radius filler operates as a rigid support and/or mold for the composite laminate during the curing the plies of the composite material at 326, thus enhancing robustness and/or consistency in forming the composite laminate.

In some examples, the forming the inlet radius filler at 310 includes forming the inlet radius filler as a single continuous structure, such as a continuous annular structure. In other examples, the forming the inlet radius filler at 310 includes forming the inlet radius filler as a plurality of discrete (i.e., separately formed) radius filler segments. In such examples, the positioning the inlet radius filler at 324 includes positioning each of the plurality of discrete radius filler segments to collectively form the inlet radius filler. Forming the inlet radius filler as a plurality of discrete radius filler segments may serve to increase a rate of manufacturing the inlet inner barrel relative to an example in which the inlet radius filler is formed as a single continuous structure.

Turning now to FIGS. 6-9, and as discussed, deformable bushing 200 may be configured and/or engineered to undergo a plastic deformation upon receiving an applied load that is greater than a threshold bushing deformation load. Deformable bushing 200 may include any of a variety of features that correspond to and/or yield such functionality. FIG. 6 is a schematic cross-sectional side elevation view representing examples of deformable bushings 200, while FIG. 7 is a schematic front elevation view representing examples of deformable bushings 200. FIG. 8 is a cross-sectional illustration of a first example of deformable bushing 200, while FIG. 9 is a cross-sectional illustration of a second example of deformable bushing 200. As schematically illustrated in FIGS. 4 and 6-9, deformable bushing 200 includes a bushing body 210 and a bushing bore 220 extending through bushing body 210 along a bushing axis 202. As further schematically illustrated in FIGS. 4 and 6-9, bushing body 210 includes a bushing outer surface 214 that is configured to engage flange bolt receiver 246 (schematically illustrated in FIG. 6) and a bushing inner surface 212 that at least partially defines bushing bore 220. Deformable bushing 200 is configured such that bushing body 210 retains its shape under an applied compressive load that is applied to bushing body 210 along a direction perpendicular to bushing axis 202 and that is less than the threshold bushing deformation load. As used herein, a load and/or force that is applied to bushing body 210 along a direction perpendicular to bushing axis 202 also may be described as a radial load.

Deformable bushing 200 may be configured such that the threshold bushing deformation load assumes any of a variety of values. In particular, in some examples, deformable bushing 200 is configured to deform plastically responsive to a shock or impact load that corresponds to a radial force that urges flange bolt shank 278 and an inner surface of flange bolt receiver 246 toward one another. As a more specific example, in which flange bolt receiver 246 is inlet flange bolt receiver 146 and flange bolt 272 is flange bolt 172, in the event that such a radial force is greater than the threshold bushing deformation load, deformable bushing 200 absorbs energy from the load via plastic deformation of bushing body 210, thus mitigating the risk of such a load causing damage to flange bolt 172, fan case attachment flange 44, and/or inlet attachment flange 144. In this manner, utilizing deformable bushing 200 in conjunction with inlet attachment flange 144 of nacelle inlet structure 100 may serve to relax a requirement that inlet attachment flange 144 be configured to withstand applied loads comparable to the threshold bushing deformation load. In particular, utilizing deformable bushing 200 in conjunction with inlet attachment flange 144 may yield a structure that satisfies necessary safety margins while allowing for inlet attachment flange 144 to be relatively thin (e.g., formed of fewer plies of composite material) compared to an example of nacelle inlet structure 100 that lacks deformable bushing 200.

In some examples, deformable bushing 200 is configured to undergo plastic deformation only when the applied compressive load is at least equal to the threshold bushing deformation load. Stated differently, in such examples, deformable bushing 200 is configured to retain its shape, strength, rigidity, etc. when exposed to compressive loads that are smaller in magnitude than the threshold bushing deformation load, and to plastically deform and/or crush when the applied compressive load is equal to or greater than the threshold bushing deformation load.

In some examples, deformable bushing 200 is configured such that the threshold bushing deformation load may be characterized relative to one or more load magnitudes associated with engine assembly 30. For example, engine assembly 30 may be characterized by a load limit that represents a magnitude of a maximum dynamic load that is expected to be encountered during nominal operative use of engine assembly 30. In some such examples, deformable bushing 200 may be configured such that the threshold bushing deformation load is roughly 2-3 times the load limit. More specifically, in some examples, a ratio of the threshold bushing deformation load to the limit load is at least 1.8:1, at least 2:1, at least 2.2:1, at least 2.4:1, at least 2.6:1, at least 2.8:1, at least 3.0:1, at most 3.2:1, at most 2.9:1, at most 2.7:1, at most 2.5:1, at most 2.3:1, at most 2.1:1, and/or at most 1.9:1. In this manner, in such examples, deformable bushing 200 is configured such that deformable bushing 200 does not undergo plastic deformation under normal operational load levels or at typical limit load levels, but does undergo plastic deformation at load levels associated with an FBO event.

Additionally or alternatively, in some cases, it may be desirable to configure deformable bushing 200 such that the threshold bushing deformation load is greater than an ultimate load level that is associated with engine assembly 30. In particular, as used herein, the ultimate load level associated with engine assembly 30 refers to a magnitude of a maximum dynamic and/or transient load that may be encountered by engine assembly 30 without compromising a structural integrity of engine assembly 30, and may be roughly 1.5 times the load limit associated with engine assembly 30.

Additionally or alternatively, in some examples, the threshold bushing deformation load corresponds to, and/or is less than, a load that is associated with an FBO event. In particular, in some examples, a load that is associated with an FBO event also may be described as being roughly 2-3 times the load limit associated with engine assembly 30. Additionally or alternatively, in various examples the threshold bushing deformation load is at least 10 kilonewtons (kN), at least 15 kN, at least 20 kN, at least 30 kN, at least 40 kN, at most 50 kN, at most 35 kN, at most 25 kN, at most 17 kN, and/or at most 12 kN.

Deformable bushing 200 and/or bushing body 210 may be formed of any of a variety of materials, examples of which include a polymer, a high-strength polymer, a thermoplastic, and/or a thermoset plastic. In various examples, deformable bushing 200 is configured such that bushing body 210 remains rigid, and/or undergoes only elastic deformation, upon receipt of a radially applied force that is less than the threshold bushing deformation load. In some more specific examples, bushing body 210 is formed of a material that has an ultimate compressive strength that is at least 100 megapascals (MPa), at least 200 MPa, at least 300 MPa, at least 400 MPa, at most 500 MPa, at most 350 MPa, at most 250 MPa, and/or at most 150 MPa. Additionally or alternatively, in some examples, bushing body 210 is formed of a material that has a compressive modulus of elasticity at 23 degrees Celsius that is at least 1 gigapasacal (GPa), at least 5 GPa, at least 10 GPa, at least 15 GPa, at least 20 GPa, at most 25 GPa, at most 17 GPa, at most 12 GPa, at most 7 GPa, and/or at most 2 GPa.

Deformable bushing 200 may have any of a variety of shapes, structural configurations, and/or geometrical features, such as may yield and/or correspond to the threshold bushing deformation load. Stated differently, in some examples, the minimum deformation load is determined not only by a material construction of bushing body 210 but also by one or more structural and/or geometrical characteristics of bushing body 210. In some examples, and as schematically illustrated in FIGS. 6-7 and less schematically illustrated in FIGS. 8-9, bushing body 210 and/or bushing bore 220 is at least substantially cylindrical. Additionally or alternatively, in some examples, and as schematically illustrated in FIGS. 4 and 6-7 and less schematically in FIGS. 8-9, bushing body 210 includes a first bushing end 204 and a second bushing end 208 such that bushing bore 220 extends between and terminates at each of first bushing end 204 and second bushing end 208. More specifically, in some examples, first bushing end 204 and second bushing end 208 are at least substantially parallel to one another, and/or one or both of first bushing end 204 and second bushing end 208 is at least substantially planar. In particular, in the example of FIG. 4, each of first bushing end 204 and second bushing end 208 is planar and forms a bearing surface that engages another component of engine assembly 30; namely, annular load absorber 120 and fan case attachment flange 44.

In some examples, first bushing end 204 and/or second bushing end 208 has a shape that is configured to facilitate plastic deformation of bushing body 210 when the applied compressive load is greater than the threshold bushing deformation load. As an example, in some examples, and as schematically illustrated in FIGS. 6-7 and less schematically illustrated in FIG. 8, first bushing end 204 and/or second bushing end 208 defines a respective bushing recess 206 that extends into bushing body 210 and at least partially circumferentially around bushing axis 202. In some examples, and as schematically illustrated in dashed lines in FIG. 7 and less schematically illustrated in FIG. 8, bushing recess 206 is an annular groove that extends fully circumferentially around bushing axis 202. In other examples, and as schematically illustrated in dash-dot lines in FIG. 7, bushing recess 206 includes, and/or consists of, a plurality of spaced-apart recesses that are circumferentially distributed around bushing axis 202. In this manner, deformable bushing 200 may be configured and/or engineered to exhibit desired structural and/or material properties, such as the magnitude of the threshold bushing deformation load, independent of the corresponding properties of the bulk material that forms bushing body 210. In particular, in some examples, such properties may be attained at least partially via appropriate configuration of bushing recess 206, such as via appropriate selection of the dimensions, depth, radial position, circumferential extent, etc. of bushing recess 206.

Additionally or alternatively, in some examples, and as schematically illustrated in FIGS. 6-7 and less schematically illustrated in FIG. 9, bushing body 210 defines one or more longitudinal tunnels 224 extending through bushing body 210 between first bushing end 204 and second bushing end 208 (shown in FIG. 6). Stated differently, in such examples, and as schematically illustrated in FIG. 6, each longitudinal tunnel 224 extends between and interconnects first bushing end 204 and second bushing end 208. Accordingly, in some such examples, and as schematically illustrated in FIGS. 6-7 and less schematically illustrated in FIG. 9, each longitudinal tunnel 224 extends at least substantially parallel to bushing bore 220.

In some examples, longitudinal tunnel(s) 224 is/are configured to facilitate the plastic deformation of bushing body 210 when the applied compressive load is greater than the threshold bushing deformation load, such as by decreasing the threshold bushing deformation load relative to that of an otherwise identical deformable bushing 200 that lacks longitudinal tunnels 224. Stated differently, when present, longitudinal tunnel(s) 224 may be described as decreasing a strength of deformable bushing 200 to withstand a radial applied force, relative to an otherwise identical deformable bushing 200 that lacks longitudinal tunnel(s) 224. In this manner, deformable bushing 200 may be configured and/or engineered to exhibit desired structural and/or material properties, such as the magnitude of the threshold bushing deformation load, independent of the corresponding properties of the bulk material that forms bushing body 210. In particular, in some examples, such properties may be attained at least partially via appropriate configuration of longitudinal tunnel(s) 224, such as via appropriate selection of the number, dimension, location, distribution, etc. of longitudinal tunnel(s) 224.

In some examples, deformable bushing 200 may be described in terms of various diameters associated with bushing body 210. In particular, in some examples, and as schematically illustrated in FIGS. 6-7, bushing outer surface 214 defines a bushing outer diameter 216 and bushing bore 220 defines a bushing inner diameter 222. In such examples, each of bushing outer diameter 216 and bushing inner diameter 222 is measured along a direction perpendicular to bushing axis 202. More specifically, in some examples, a ratio of bushing outer diameter 216 to bushing inner diameter 222 is at least 1.2:1, at least 1.5:1, at least 2:1, at least 3:1, at least 5:1, at most 10:1, at most 7:1, at most 4:1, at most 2.5:1, at most 1.7:1, and/or at most 1.3:1. In particular, configuring bushing body 210 such that the ratio of bushing outer diameter 216 to bushing inner diameter 222 is relatively large (e.g., at least 1.2:1) may yield an enhanced capacity of deformable bushing 200 to absorb energy, such as by yielding a correspondingly large threshold bushing deformation load.

FIGS. 8-9 provide less schematic illustrations of respective examples of deformable bushings 200. In particular, FIG. 8 is a cross-sectional view of an example of deformable bushing 200 in which each of first bushing end 204 and second bushing end 208 defines a respective bushing recess 206, each of which extends fully circumferentially around bushing axis 202. In the example of FIG. 8, each of first bushing end 204 and second bushing end 208 may be described as being at least substantially planar. Similarly, FIG. 9 is a cross-sectional view of another example of deformable bushing 200. In particular, in the example of FIG. 9, bushing body 210 defines a plurality of longitudinal tunnels 224 extending through bushing body 210 between first bushing end 204 and second bushing end 208.

Illustrative, non-exclusive examples of inventive subject matter according to the present disclosure are described in the following enumerated paragraphs:

A1. A deformable bushing (200) for providing a bearing between a flange bolt shank (278) of a flange bolt (272) and a flange bolt receiver (246) of an attachment flange (244), the deformable bushing (200) comprising:
  a bushing body (210); and
  a bushing bore (220) extending through the bushing body (210) along a bushing axis (202);
  wherein the bushing body (210) includes:
    a bushing outer surface (214) that is configured to engage the flange bolt receiver (246);
    and a bushing inner surface (212) that at least partially defines the bushing bore (220);
  wherein the deformable bushing (200) is configured such that the bushing body (210) retains its shape under an applied compressive load that is applied to the bushing body (210) along a direction perpendicular to the bushing axis (202) and that is less than a threshold bushing deformation load; wherein the deformable bushing (200) is configured such that the deformable bushing (200) undergoes plastic deformation when the applied compressive load is greater than the threshold bushing deformation load; and wherein the threshold bushing deformation load is at least 10 kilonewtons (kN) and at most 50 kN.

A2. The deformable bushing (200) of paragraph A1, wherein the threshold bushing deformation load is one or more of at least 15 kN, at least 20 kN, at least 30 kN, at least 40 kN, at most 35 kN, at most 25 kN, at most 17 kN, and at most 12 kN.

A3. The deformable bushing (200) of any of paragraphs A1-A2, wherein the deformable bushing (200) is configured to be utilized in an engine assembly (30) that is characterized by a limit load that represents a magnitude of a maximum dynamic load expected to be encountered during nominal operative use of the engine assembly (30); and wherein a ratio of the threshold bushing deformation load to the limit load is one or more of at least 1.8:1, at least 2:1, at least 2.2:1, at least 2.4:1, at least 2.6:1, at least 2.8:1, at least 3.0:1, at most 3.2:1, at most 2.9:1, at most 2.7:1, at most 2.5:1, at most 2.3:1, at most 2.1:1, and at most 1.9:1.

A4 The deformable bushing (200) of any of paragraphs A1-A3, wherein the deformable bushing (200) is configured to undergo plastic deformation only when the applied compressive load is at least equal to the threshold bushing deformation load.

A5. The deformable bushing (200) of any of paragraphs A1-A4, wherein the bushing body (210) is formed of a material that has an ultimate compressive strength that is one or more of at least 100 megapascals (MPa), at least 200 MPa, at least 300 MPa, at least 400 MPa, at most 500 MPa, at most 350 MPa, at most 250 MPa, and at most 150 MPa.

A6. The deformable bushing (200) of any of paragraphs A1-A5, wherein the bushing body (210) is formed of a material that has a compressive modulus of elasticity at 23 degrees Celsius that is one or more of at least 1 gigapasacal (GPa), at least 5 GPa, at least 10 GPa, at least 150 GPa, at least 20 GPa, at most 25 GPa, at most 17 GPa, at most 12 GPa, at most 7 GPa, and at most 2 GPa.

A7. The deformable bushing (200) of any of paragraphs A1-A6, wherein the bushing body (210) is formed of one or more of a polymer, a high-strength polymer, a thermoplastic, and a thermoset plastic.

A8. The deformable bushing (200) of any of paragraphs A1-A7, wherein the bushing body (210) is at least substantially cylindrical.

A9. The deformable bushing (200) of any of paragraphs A1-A8, wherein the bushing bore (220) is at least substantially cylindrical.

A10. The deformable bushing (200) of any of paragraphs A1-A9, wherein the bushing outer surface (214) defines a bushing outer diameter (216), as measured along a direction perpendicular to the bushing axis (202); wherein the bushing bore (220) defines a bushing inner diameter (222), as measured along a direction perpendicular to the bushing axis (202); and wherein a ratio of the bushing outer diameter (216) to the bushing inner diameter (222) is one or more of at least 1.2:1, at least 1.5:1, at least 2:1, at least 3:1, at least 5:1, at most 10:1, at most 7:1, at most 4:1, at most 2.5:1, at most 1.7:1, and at most 1.3:1.

A11. The deformable bushing (200) of any of paragraphs A1-A10, wherein the bushing body (210) includes a first bushing end (204) and a second bushing end (208); wherein the bushing bore (220) extends between and terminates at each of the first bushing end (204) and the second bushing end (208); and wherein one or more of:
  (i) the first bushing end (204) and the second bushing end (208) are at least substantially parallel to one another;
  (ii) one or both of the first bushing end (204) and the second bushing end (208) is at least substantially planar; and
  (iii) one or both of the first bushing end (204) and the second bushing end (208) has a shape that is configured to facilitate plastic deformation of the bushing body (210) when the applied compressive load is greater than the threshold bushing deformation load.

A12. The deformable bushing (200) of paragraph A11, wherein one or both of the first bushing end (204) and the second bushing end (208) defines an respective bushing recess (206) that extends into the bushing body (210) and that extends at least partially circumferentially around the bushing axis (202).

A13. The deformable bushing (200) of paragraph A12, wherein the respective bushing recess (206) is an annular groove that extends fully circumferentially around the bushing axis (202).

A14. The deformable bushing (200) of any of paragraphs A12-A13, wherein the respective bushing recess (206) includes a plurality of spaced-apart recesses circumferentially distributed around the bushing axis (202).

A15. The deformable bushing (200) of any of paragraphs A1-A14, wherein the bushing body (210) defines one or more longitudinal tunnels (224) extending through the bushing body (210) between a/the first bushing end (204) and a/the second bushing end (208); wherein the one or more longitudinal tunnels (224) are configured to facilitate plastic deformation of the bushing body (210) when the applied compressive load is greater than the threshold bushing deformation load.

B1. A nacelle inlet structure (100) of an engine assembly (30), the nacelle inlet structure (100) comprising:
  an inlet inner barrel (140) extending circumferentially around an engine axis (32) of the engine assembly (30) and extending at least partially along a direction parallel to the engine axis (32); and
  an inlet outer barrel (130) at least substantially enclosing the inlet inner barrel (140) and extending circumferentially around the engine axis (32) and at least partially along a direction parallel to the engine axis (32);
  wherein the inlet inner barrel (140) includes:

a tubular portion (142) that extends at least partially along a direction parallel to the engine axis (32); and an inlet attachment flange (144) extending from the tubular portion (142) and configured to be operatively coupled to an engine case (40) of the engine assembly (30) to operatively couple the nacelle inlet structure (100) to the engine case (40);

wherein the inlet attachment flange (144) is integrally formed with at least a portion of the tubular portion (142).

B2. The nacelle inlet structure (100) of paragraph B1, wherein the inlet attachment flange (144) extends radially away from the engine axis (32) along a direction at least substantially perpendicular to the engine axis (32).

B3. The nacelle inlet structure (100) of any of paragraphs B1-B2, wherein the inlet attachment flange (144) extends fully circumferentially around the engine axis (32).

B4. The nacelle inlet structure (100) of any of paragraphs B1-B3, further comprising a lipskin (110) extending between the inlet outer barrel (130) and the inlet inner barrel (140) at least at a forward end (102) of the nacelle inlet structure (100).

B5. The nacelle inlet structure (100) of paragraph B4, wherein the lipskin (110) at least partially defines the inlet outer barrel (130).

B6. The nacelle inlet structure (100) of any of paragraphs B4-B5, wherein the inlet outer barrel (130) includes, and optionally is, an outside mold line (OML) panel (132) that is operatively coupled to the lipskin (110).

B7. The nacelle inlet structure (100) of any of paragraphs B4-B6, wherein the lipskin (110) at least partially defines the inlet inner barrel (140).

B8. The nacelle inlet structure (100) of any of paragraphs B1-B7, further comprising an aft bulkhead (114) extending between and operatively coupled to each of the inlet inner barrel (140) and the inlet outer barrel (130).

B9. The nacelle inlet structure (100) of paragraph B8, further comprising an annular load absorber (120) that is operatively coupled to each of the aft bulkhead (114) and the inlet inner barrel (140); wherein the aft bulkhead (114) is operatively coupled to the inlet inner barrel (140) via the annular load absorber (120).

B10. The nacelle inlet structure (100) of paragraph B9, further comprising a plurality of absorber fasteners (124) that operatively couples the annular load absorber (120) to the aft bulkhead (114).

B11. The nacelle inlet structure (100) of any of paragraphs B9-B10, wherein the annular load absorber (120) is operatively coupled to the inlet attachment flange (144).

B12. The nacelle inlet structure (100) of any of paragraphs B1-B11, further comprising a forward bulkhead (112) extending between and operatively coupled to each of the inlet inner barrel (140) and the inlet outer barrel (130).

B13. The nacelle inlet structure (100) of any of paragraphs B1-B12, wherein the inlet inner barrel (140) defines a duct for directing air into the engine assembly (30).

B14. The nacelle inlet structure (100) of any of paragraphs B1-B13, wherein the inlet inner barrel (140) includes a back skin (152) that faces toward the inlet outer barrel (130); and wherein the back skin (152) is integrally formed with the inlet attachment flange (144).

B15. The nacelle inlet structure (100) of paragraph B14, wherein the inlet inner barrel (140) includes a composite laminate (106) that includes each of the inlet attachment flange (144) and the back skin (152).

B16. The nacelle inlet structure (100) of paragraph B15, wherein the tubular portion (142) includes a barrel base structure (108); and wherein the composite laminate (106) is operatively coupled to the barrel base structure (108).

B17. The nacelle inlet structure (100) of any of paragraphs B14-B16, wherein the tubular portion (142) includes at least a portion of the back skin (152).

B18. The nacelle inlet structure (100) of any of paragraphs B14-17, wherein the inlet attachment flange (144) and the back skin (152) are formed in a composite manufacturing process as a unitary composite structure.

B19. The nacelle inlet structure (100) of any of paragraphs B14-B18, wherein one or both of the inlet inner barrel (140) and the tubular portion (142) includes a face sheet (154) that faces toward the engine axis (32); wherein at least a portion of the face sheet (154) is spaced apart from the back skin (152); and optionally wherein a portion of the face sheet (154) extends adjacent to at least a portion of the inlet attachment flange (144).

B20. The nacelle inlet structure (100) of any of paragraphs B1-B19, wherein the inlet inner barrel (140) includes an acoustic structure (150) for mitigating acoustic noise generated by the engine assembly (30); optionally wherein the tubular portion (142) includes the acoustic structure (150).

B21. The nacelle inlet structure (100) of paragraph B20, wherein the acoustic structure (150) includes an acoustic structure core (156) that operates to mitigate acoustic noise generated by the engine assembly (30); optionally wherein at least a portion of the acoustic structure core (156) extends between a/the back skin (152) and a/the face sheet (154).

B22. The nacelle inlet structure (100) of any of paragraphs B20-B21, wherein the acoustic structure (150) includes one or both of:
(i) at least a portion of a/the back skin (152); and
(ii) at least a portion of a/the face sheet (154).

B23. The nacelle inlet structure (100) of any of paragraphs B20-B22, wherein one or both of the acoustic structure (150) and a/the acoustic structure core (156) includes, and optionally is, one or more of an acoustic panel, an acoustic liner, a honeycomb panel, a resonator, and a Helmholtz resonator.

B24. The nacelle inlet structure (100) of any of paragraphs B20-B23, wherein a/the barrel base structure (108) includes at least a portion of the acoustic structure (150).

B25. The nacelle inlet structure (100) of any of paragraphs B1-B24, wherein the inlet inner barrel (140) includes a flange transition region (148) extending between and interconnecting the tubular portion (142) and the inlet attachment flange (144); wherein the flange transition region (148) is integrally formed with the inlet attachment flange (144) and at least a portion of the tubular portion (142), optionally one or both of a/the back skin (152) and a/the face sheet (154); and optionally wherein the flange transition region (148) is smoothly curved between the tubular portion (142) and the inlet attachment flange (144).

B26. The nacelle inlet structure (100) of paragraph B25, wherein the inlet inner barrel (140) includes an inlet radius channel (104) defined between the flange transition region (148) and one or more other portions of the inlet inner barrel (140), optionally one or more of the tubular portion (142), an/the acoustic structure (150), the back skin (152), and the face sheet (154); and wherein the inlet inner barrel (140) further includes an inlet radius filler (160) received within the inlet radius channel (104).

B27. The nacelle inlet structure (100) of paragraph B26, wherein the inlet radius channel (104) is defined between a/the composite laminate (106) and a/the barrel base structure (108) in a region adjacent to the flange transition region (148).

B28. The nacelle inlet structure (100) of any of paragraphs B26-B27, wherein the inlet radius filler (160) at least substantially fills the inlet radius channel (104).

B29. The nacelle inlet structure (100) of any of paragraphs B26-B28, wherein the inlet radius filler (160) is configured to enhance a rigidity of the inlet attachment flange (144) relative to the tubular portion (142).

B30. The nacelle inlet structure (100) of any of paragraphs B26-B29, wherein the inlet radius filler (160) is formed of a radius filler material that includes, and optionally is, one or more of chopped carbon fibers, a rigid material, an epoxy, a cured epoxy, and a potting compound.

B31. The nacelle inlet structure (100) of any of paragraphs B1-B30, wherein the engine case (40) includes, and optionally is, a fan case (42) that at least substantially encloses a fan (60) of the engine assembly (30).

B32. The nacelle inlet structure (100) of paragraph B31, wherein the inlet attachment flange (144) is configured to be operatively coupled to the fan case (42), optionally a fan case attachment flange (44) of the fan case (42), to operatively couple the nacelle inlet structure (100) to the engine case (40).

B33. The nacelle inlet structure (100) of any of paragraphs B31-B32, wherein the inlet attachment flange (144) is configured to abut and/or directly engage the fan case (42) when the nacelle inlet structure (100) is operatively coupled to the engine case (40).

B34. The nacelle inlet structure (100) of any of paragraphs B31-B33, wherein the fan (60) includes a plurality of fan blades (62); and wherein the nacelle inlet structure (100) is configured such that the nacelle inlet structure (100) remains coupled to the engine case (40) in the event that a fan blade (62) detaches from the fan (60) during use of the engine assembly (30).

B35. The nacelle inlet structure (100) of any of paragraphs B1-B34, further comprising a plurality of flange bolt assemblies (170) for operatively coupling the inlet attachment flange (144) to the engine case (40).

B36. The nacelle inlet structure (100) of paragraph B35, wherein each flange bolt assembly (170) of the plurality of flange bolt assemblies (170) includes a respective flange bolt (172) with a respective flange bolt head (176) and a respective flange bolt shank (178) extending away from the respective flange bolt head (176) along a respective flange bolt axis (174).

B37. The nacelle inlet structure (100) of any of paragraphs B1-B36, wherein the inlet attachment flange (144) is configured to be operatively coupled to the engine case (40) via a/the plurality of flange bolt assemblies (170).

B38. The nacelle inlet structure (100) of paragraph B37, wherein the inlet attachment flange (144) at least partially defines each of a plurality of inlet flange bolt receivers (146) circumferentially distributed around the engine axis (32); wherein each inlet flange bolt receiver (146) of the plurality of inlet flange bolt receivers (146) is configured to receive a/the respective flange bolt shank (178) of a respective flange bolt assembly (170) of the plurality of flange bolt assemblies (170).

B39. The nacelle inlet structure (100) of paragraph B38, wherein a/the fan case attachment flange (44) defines a plurality of fan case flange bolt receivers (46); and wherein each inlet flange bolt receiver (146) of the plurality of inlet flange bolt receivers (146) is aligned with a corresponding fan case flange bolt receiver (46) of the plurality of fan case flange bolt receivers (46) such that each respective flange bolt shank (178) extends through a respective inlet flange bolt receiver (146) and the corresponding fan case flange bolt receiver (46) to operatively couple the nacelle inlet structure (100) to the engine case (40).

B40. The nacelle inlet structure (100) of paragraph B39, wherein an/the annular load absorber (120) defines a plurality of load absorber bolt receivers (122); and wherein each inlet flange bolt receiver (146) of the plurality of inlet flange bolt receivers (146) is aligned with a corresponding load absorber bolt receiver (122) of the plurality of load absorber bolt receivers (122) such that each respective flange bolt shank (178) extends through a respective inlet flange bolt receiver (146) and the corresponding load absorber bolt receiver (122) when the annular load absorber (120) is operatively coupled to the fan case attachment flange (44).

B41. The nacelle inlet structure (100) of any of paragraphs B37-B40, wherein each flange bolt assembly (170) of the plurality of flange bolt assemblies (170) further includes one or more of:
 (i) a respective nut (180) for threadingly engaging the respective flange bolt (172);
 (ii) a respective deformable spacer (182) configured to be positioned on the respective flange bolt shank (178) external to the inlet attachment flange (144); wherein the deformable spacer (182) is configured to undergo a plastic deformation upon receiving an applied compressive load that is greater than a threshold compressive load; and
 (iii) a respective bushing (184) configured to be positioned within the respective inlet flange bolt receiver (146) to provide a bearing between the respective flange bolt shank (178) and the respective inlet flange bolt receiver (146).

B42. The nacelle inlet structure (100) of paragraph B41, wherein the respective bushing (184) is the deformable bushing (200) of any of paragraphs A1-A15.

B43. The nacelle inlet structure (100) of any of paragraphs B37-B42, when dependent from paragraph B9, wherein the annular load absorber (120) is operatively coupled to the inlet attachment flange (144) via the plurality of flange bolt assemblies (170).

B44. The nacelle inlet structure (100) of any of paragraphs B1-B43, wherein the inlet attachment flange (144) is operatively coupled to the tubular portion (142) without the use of mechanical fasteners.

C1. A method (300) of manufacturing the inlet inner barrel (140) of the nacelle inlet structure (100) of any of paragraphs B1-B44, the method comprising:
 forming (320), with a composite manufacturing process, a composite laminate (106) that includes a/the back skin (152) and the inlet attachment flange (144).

C2. The method (300) of paragraph C1, wherein the forming (320) the composite laminate (106) includes:
 molding (322) a plurality of plies of a composite material to define the back skin (152) and the inlet attachment flange (144); and
 subsequent to the molding (322) the plurality of plies of the composite material, curing (326) the plurality of plies of the composite material to solidify the composite laminate (106).

C3. The method (300) of paragraph C2, wherein the composite material includes, and optionally is, a fiber-reinforced material, optionally a carbon fiber-reinforced material.

C4. The method (300) of any of paragraphs C2-C3, wherein the molding (322) the plurality of plies of the composite material includes configuring the composite laminate (106) to include a number of plies of the composite material that varies across an extent of the composite laminate (106).

C5. The method (300) of paragraph C4, wherein the molding (322) the plurality of plies of the composite material includes forming the inlet attachment flange (144) with a greater number of plies of the composite material than the number of plies of the composite material that form a/the tubular portion (142).

C6. The method (300) of any of paragraphs C2-C5, wherein the molding (322) the plurality of plies of the composite material includes forming a/the flange transition region (148) and an/the inlet radius channel (104).

C7. The method (300) of any of paragraphs C2-C6, wherein the molding (322) the plurality of plies of the composite material includes positioning the composite laminate (106) relative to a/the barrel base structure (108) such that the inlet radius channel (104) is defined between the composite laminate (106) and the barrel base structure (108).

C8. The method (300) of any of paragraphs C2-C7, further comprising, prior to the curing (326) the plurality of plies of the composite material, positioning (324) an/the inlet radius filler (160) relative to the composite laminate (106).

C9. The method (300) of paragraph C8, wherein the positioning (324) the inlet radius filler (160) includes positioning the inlet radius filler (160) within an/the inlet radius channel (104).

C10. The method (300) of any of paragraphs C8-C9, wherein the positioning (324) the inlet radius filler (160) is performed at least partially subsequent to the molding (322) the plurality of plies of the composite material.

C11. The method (300) of any of paragraphs C8-C9, wherein the molding (322) the plurality of plies of the composite material is performed at least partially subsequent to the positioning (324) the inlet radius filler (160).

C12. The method (300) of paragraph C11, wherein the molding (322) the plurality of plies of the composite material includes, subsequent to the positioning (324) the inlet radius filler (160), positioning at least a portion of one or both of a/the back skin (152) and a/the face sheet (154) adjacent to the inlet radius filler (160).

C13. The method (300) of any of paragraphs C8-C12, wherein the positioning (324) the inlet radius filler (160) and the molding (322) the plurality of plies of the composite material are performed at least partially concurrently.

C14. The method (300) of any of paragraphs C8-C13, further comprising, prior to the positioning (324) the inlet radius filler (160), forming (310) the inlet radius filler (160).

C15. The method (300) of paragraph C14, wherein the forming (310) the inlet radius filler (160) includes:
 molding (312) a/the radius filler material into a shape corresponding to a shape of the inlet radius channel (104); and
 solidifying (314) the radius filler material to form the inlet radius filler (160) as a solid structure.

C16. The method (300) of any of paragraphs C14-C15, wherein the forming (310) the inlet radius filler (160) includes forming the inlet radius filler (160) as a single continuous structure, optionally an annular structure.

C17. The method (300) of any of paragraphs C14-C15, wherein the forming (310) the inlet radius filler (160) includes forming the inlet radius filler (160) as a plurality of discrete radius filler segments; and wherein the positioning (324) the inlet radius filler (160) includes positioning each of the plurality of discrete radius filler segments relative to the composite laminate (106) to collectively form the inlet radius filler (160).

D1. An engine assembly (30) comprising the nacelle inlet structure (100) of any of paragraphs B1-B44.

D2. The engine assembly (30) of paragraph D1, wherein the engine assembly (30) includes, and optionally is, one or more of a jet engine, a turbofan engine, and a turbojet engine.

D3. The engine assembly (30) of any of paragraphs D1-D2, wherein the engine assembly (30) includes a/the fan (60) and a gas turbine engine (70) for driving the fan (60).

D4. The engine assembly (30) of any of paragraphs D1-D3, further comprising:
 a/the fan (60); and
 a/the fan case (42) operatively coupled to the inlet attachment flange (144) and at least substantially enclosing the fan (60).

E1. A vehicle (10) comprising the engine assembly (30) of any of paragraphs D1-D4.

E2. The vehicle (10) of paragraph E1, wherein the vehicle (10) is an aircraft (20) that includes a fuselage (22), one or more wings (24) extending from the fuselage (22), and a tail (26); and optionally wherein the one or more wings (24) support the engine assembly (30).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A nacelle inlet structure of an engine assembly, the nacelle inlet structure comprising:
   an inlet inner barrel extending circumferentially around an engine axis of the engine assembly and extending at least partially along a direction parallel to the engine axis;

an inlet outer barrel extending circumferentially around the engine axis and at least partially along the direction parallel to the engine axis;

an aft bulkhead extending between and operatively coupled to each of the inlet inner barrel and the inlet outer barrel; and a U-shaped annular load absorber that is operatively coupled to each of the aft bulkhead and the inlet inner barrel; wherein the aft bulkhead is operatively coupled to the inlet inner barrel via the U-shaped annular load absorber; and wherein the U-shaped annular load absorber is open toward the inlet outer barrel;

wherein the inlet inner barrel includes:

a tubular portion that extends at least partially along a direction parallel to the engine axis, wherein the U-shaped annular load absorber is spaced-away from the tubular portion; and an inlet attachment flange extending from the tubular portion and configured to be operatively coupled to an engine case of the engine assembly to operatively couple the nacelle inlet structure to the engine case, wherein the U-shaped annular load absorber is coupled to the inlet attachment flange.

2. The nacelle inlet structure of claim 1, further comprising a plurality of flange bolt assemblies; wherein the inlet attachment flange is configured to be operatively coupled to the engine case via the plurality of flange bolt assemblies; wherein each flange bolt assembly of the plurality of flange bolt assemblies includes a respective flange bolt with a respective flange bolt head and a respective flange bolt shank extending away from the respective flange bolt head along a respective flange bolt axis; wherein the inlet attachment flange at least partially defines each of a plurality of inlet flange bolt receivers circumferentially distributed around the engine axis; and wherein each inlet flange bolt receiver of the plurality of inlet flange bolt receivers is configured to receive the respective flange bolt shank of a respective flange bolt assembly of the plurality of flange bolt assemblies.

3. The nacelle inlet structure of claim 2, wherein the engine case includes a fan case; wherein the inlet attachment flange is configured to be operatively coupled to a fan case attachment flange of the fan case to operatively couple the nacelle inlet structure to the engine case; wherein the fan case attachment flange defines a plurality of fan case flange bolt receivers; and wherein each inlet flange bolt receiver of the plurality of inlet flange bolt receivers is aligned with a corresponding fan case flange bolt receiver of the plurality of fan case flange bolt receivers, such that each respective flange bolt shank extends through a respective inlet flange bolt receiver and the corresponding fan case flange bolt receiver to operatively couple the nacelle inlet structure to the engine case.

4. The nacelle inlet structure of claim 2, wherein each flange bolt assembly of the plurality of flange bolt assemblies further includes a respective deformable spacer positioned on the respective flange bolt shank, external to the inlet attachment flange; and wherein the respective deformable spacer is configured to plastically deform upon receiving an applied compressive load that is greater than a threshold compressive load.

5. The nacelle inlet structure of claim 2, wherein each flange bolt assembly of the plurality of flange bolt assemblies includes a respective bushing positioned within a respective inlet flange bolt receiver of the plurality of inlet flange bolt receivers to provide a bearing between the respective flange bolt shank and the respective inlet flange bolt receiver.

6. An engine assembly comprising the nacelle inlet structure of claim 1.

7. The nacelle inlet structure of claim 1, wherein the U-shaped annular load absorber is operatively coupled to an aft side of the aft bulkhead.

8. The nacelle inlet structure of claim 2, wherein the U-shaped annular load absorber comprises a forward flange, an aft flange, and a web interconnecting the forward flange and the aft flange, and wherein the aft flange at least partially defines each of the plurality of inlet flange bolt receivers.

9. The nacelle inlet structure of claim 1, wherein the inlet attachment flange extends radially away from the engine axis.

10. The nacelle inlet structure of claim 1, wherein the inlet attachment flange extends fully circumferentially around the engine axis.

11. The nacelle inlet structure of claim 1, wherein the inlet inner barrel comprises a back skin that faces toward the inlet outer barrel; and wherein the back skin is integrally formed with the inlet attachment flange.

12. The nacelle inlet structure of claim 1, further comprising a lipskin extending between the inlet outer barrel and the inlet inner barrel at least at a forward end of the nacelle inlet structure.

13. The nacelle inlet structure of claim 12, wherein the lipskin at least partially defines the inlet outer barrel.

14. The nacelle inlet structure of claim 12, wherein the inlet outer barrel comprises an outside mold line panel that is operatively coupled to the lipskin.

15. The nacelle inlet structure of claim 12, wherein the lipskin at least partially defines the inlet inner barrel.

16. The nacelle inlet structure of claim 1, further comprising a plurality of absorber fasteners that operatively couples the U-shaped annular load absorber to the aft bulkhead.

17. An engine assembly, comprising:
the nacelle inlet structure of claim 1;
a fan; and
a fan case operatively coupled to the nacelle inlet structure.

18. An aircraft, comprising:
a fuselage;
a wing extending from the fuselage; and
the engine assembly of claim 17 supported by the wing.

19. An aircraft, comprising:
a fuselage;
two wings extending from the fuselage; and
an engine assembly according to claim 17 supported by each of the two wings.

20. An engine assembly, comprising:
the nacelle inlet structure of claim 16;
a fan; and
a fan case operatively coupled to the nacelle inlet structure.

* * * * *